(12) United States Patent
Kanoh et al.

(10) Patent No.: US 11,457,240 B2
(45) Date of Patent: Sep. 27, 2022

(54) ENCODER, DECODER, ENCODING METHOD, AND DECODING METHOD

(71) Applicant: Panasonic Intellectual Property Corporation of America, Torrance, CA (US)

(72) Inventors: Ryuichi Kanoh, Osaka (JP); Tadamasa Toma, Osaka (JP); Kiyofumi Abe, Osaka (JP); Takahiro Nishi, Nara (JP); Masato Ohkawa, Toyama (JP); Hideo Saitou, Ishikawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/840,906

(22) Filed: Apr. 6, 2020

(65) Prior Publication Data

US 2020/0236400 A1 Jul. 23, 2020

Related U.S. Application Data

(63) Continuation of application No. PCT/JP2018/035903, filed on Sep. 27, 2018.
(Continued)

(51) Int. Cl.
*H04N 11/02* (2006.01)
*H04N 19/60* (2014.01)
(Continued)

(52) U.S. Cl.
CPC .......... *H04N 19/60* (2014.11); *H04N 19/124* (2014.11); *H04N 19/176* (2014.11); *H04N 19/45* (2014.11)

(58) Field of Classification Search
CPC ...................................................... H04N 19/60
(Continued)

(56) References Cited

U.S. PATENT DOCUMENTS

2002/0176500 A1* 11/2002 Bakhmutsky .......... H04N 19/61
375/240.13
2010/0118959 A1* 5/2010 Lou ....................... H04N 19/197
375/240.16
(Continued)

OTHER PUBLICATIONS

International Search Report (ISR) dated Nov. 27, 2018 in International (PCT) Application No. PCT/JP2018/035903.
(Continued)

*Primary Examiner* — Leron Beck
(74) *Attorney, Agent, or Firm* — Wenderoth, Lind & Ponack, L.L.P.

(57) ABSTRACT

An encoder which transforms a current block to be encoded in an image to encode the current block includes circuitry and memory. The circuitry, using the memory: determines a plurality of first transform basis candidates and transforms the current block using a transform basis included in the plurality of first transform basis candidates determined, when the current block has a first size; and determines one or more second transform basis candidates different from the plurality of first transform basis candidates and transforms the current block using a transform basis included in the one or more second transform basis candidates determined, when the current block has a second size larger than the first size.

2 Claims, 38 Drawing Sheets

Related U.S. Application Data

(60) Provisional application No. 62/570,784, filed on Oct. 11, 2017, provisional application No. 62/569,200, filed on Oct. 6, 2017.

(51) Int. Cl.
   *H04N 19/124* (2014.01)
   *H04N 19/176* (2014.01)
   *H04N 19/44* (2014.01)

(58) Field of Classification Search
   USPC .................................. 375/240.01–240.29
   See application file for complete search history.

(56) References Cited

U.S. PATENT DOCUMENTS

| | | | |
|---|---|---|---|
| 2010/0316257 A1* | 12/2010 | Xu ..................... | G06K 9/3241 |
| | | | 382/103 |
| 2015/0249840 A1 | 9/2015 | Kim et al. | |
| 2016/0219290 A1 | 7/2016 | Zhao et al. | |

OTHER PUBLICATIONS

H.265 (ISO/IEC 23008-2 HEVC (High Efficiency Video Coding)), Dec. 1, 2013.

* cited by examiner

FIG. 3

| TRANSFORM TYPE | BASIS FUNCTION $T_i(j)$, $i, j = 0, 1, ..., N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ <br> WHERE $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$ <br> WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

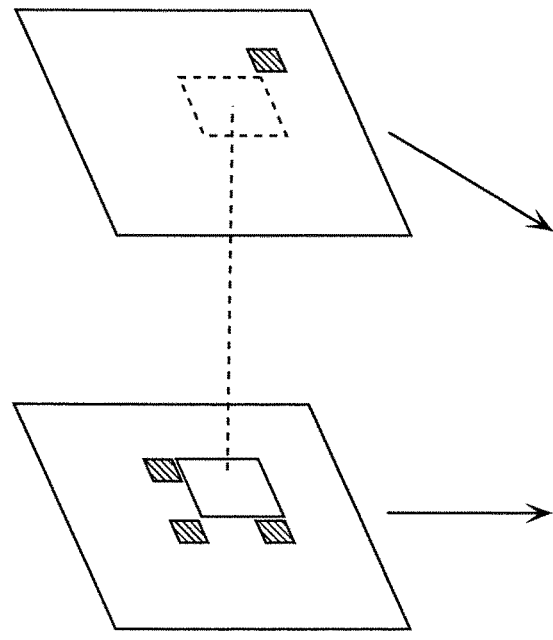

| Transform | Size4 | Size8 | Size16 | Size32 |
|---|---|---|---|---|
| DCT2 | ○ | ○ | ○ | ○ |
| DCT5 | ○ | ○ | × | ○ |
| DCT8 | ○ | ○ | ○ | × |
| DST1 | ○ | ○ | ○ | × |
| DST7 | ○ | ○ | ○ | × |

ENCODER, DECODER, ENCODING METHOD, AND DECODING METHOD

CROSS REFERENCE TO RELATED APPLICATIONS

This application is a U.S. Continuation Application of PCT International Patent Application Number PCT/JP2018/035903 filed on Sep. 27, 2018, claiming the benefit of priority of U.S. Provisional Patent Application No. 62/569,200 filed on Oct. 6, 2017, and the benefit of priority of U.S. Patent Application No. 62/570,784 filed on Oct. 11, 2017, the entire contents of which are hereby incorporated by reference.

BACKGROUND

1. Technical Field

The present disclosure relates to encoders, decoders, encoding methods, and decoding methods.

2. Description of the Related Art

Video coding standard called High-Efficiency Video Coding (HEVC) has been standardized by Joint Collaborative Team on Video Coding (JCT-VC). See H.265 (ISO/IEC 23008-2 HEVC (High Efficiency Video Coding)).

SUMMARY

An encoder according to an aspect of the present disclosure is an encoder which transforms a current block to be encoded in an image to encode the current block includes circuitry and memory. The circuitry, using the memory: determines a plurality of first transform basis candidates and transforms the current block using a transform basis included in the plurality of first transform basis candidates determined, when the current block has a first size; and determines one or more second transform basis candidates different from the plurality of first transform basis candidates and transforms the current block using a transform basis included in the one or more second transform basis candidates determined, when the current block has a second size larger than the first size.

A decoder according to an aspect of the present disclosure is a decoder which inverse-transforms a current block to be decoded in an encoded image to decode the current block includes circuitry and memory. The circuitry, using the memory: determines a plurality of first inverse transform basis candidates and inverse-transforms the current block using an inverse transform basis included in the plurality of first inverse transform basis candidates determined, when the current block has a first size; and determines one or more second inverse transform basis candidates different from the plurality of first inverse transform basis candidates and inverse-transforms the current block using an inverse transform basis included in the one or more inverse second transform basis candidates determined, when the current block has a second size larger than the first size.

It is to be noted that these general and specific aspects may be implemented using a system, a method, an integrated circuit, a computer program, or a computer-readable recording medium such as a CD-ROM, or any combination of systems, methods, integrated circuits, computer programs, or computer-readable recording media.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type.

FIG. 9B is for illustrating an outline of a process for deriving a motion vector via merge mode.

Figure 1:
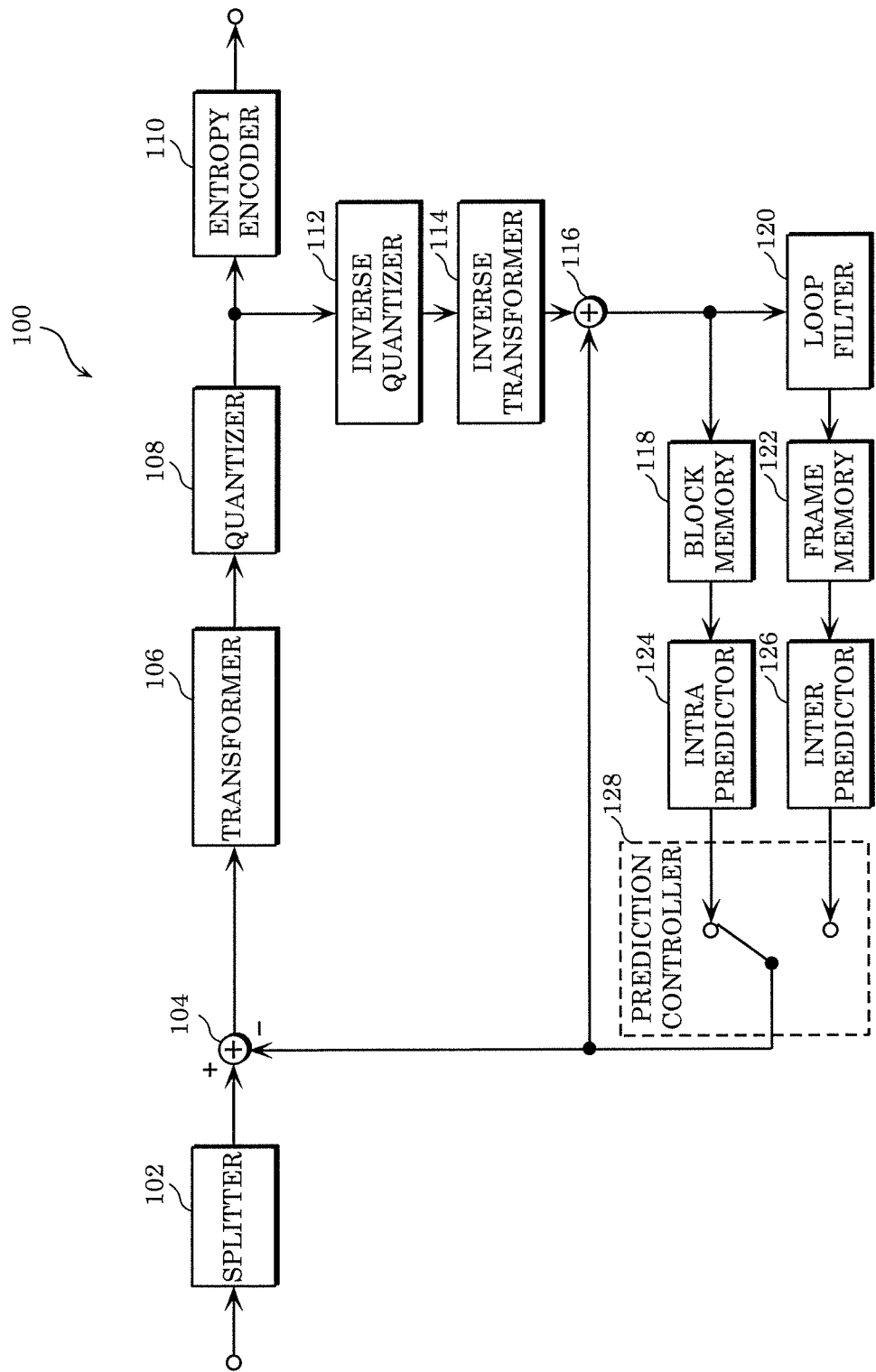
FIG. 1 is a block diagram illustrating a functional configuration of an encoder according to Embodiment 1.

DETAILED DESCRIPTION OF THE EMBODIMENTS (Underlying Knowledge Forming Basis of the Present Disclosure)

Methods for selectively using a plurality of bases in order to efficiently perform frequency transform on residuals of a current block to be encoded have been proposed (examples of the methods include explicit multiple core transform (EMT) and adaptive multiple transform (AMT)). Such methods require evaluation (cost evaluation, etc.) of the plurality of bases in order to select a basis for a current block from among the plurality of bases, which increases the load and time for an encoding process. Furthermore, such methods require a computation circuit for transform/inverse-transform using each basis, resulting in increase in circuit scale. In addition, there are some bases which do not enable fast computation depending on block sizes, and thus processing time increases when a basis that does not enable fast computation is selected.

(Summary of the Present Disclosure)

In view of this, an encoder according to an aspect of the present disclosure is an encoder which transforms a current block to be encoded in an image to encode the current block includes circuitry and memory. The circuitry, using the memory: determines a plurality of first transform basis candidates and transforms the current block using a transform basis included in the plurality of first transform basis candidates determined, when the current block has a first size; and determines one or more second transform basis candidates different from the plurality of first transform basis candidates and transforms the current block using a transform basis included in the one or more second transform basis candidates determined, when the current block has a second size larger than the first size.

With the encoder, it is possible to switch transform basis candidates depending on a block size of a current block, and thus to use a more suitable transform basis. For example, it is possible to reduce cost for signalling transform basis information and reduce processing load and/or processing time if reducing the number of transform basis candidates when the current block has the second size larger than the first size.

For example, in the encoder according to the aspect of the present disclosure, the number of the one or more second transform basis candidates may be smaller than the number of the plurality of first transform basis candidates.

In this way, it is possible to reduce the number of transform basis candidates when the current block has the second size larger than the first size, and thus to reduce cost for signalling the transform basis information and reduce the number of transform coefficients by adaptively selecting the transform basis from the plurality of transform basis candidates. Furthermore, it is also possible to exclude at least one transform basis from the transform basis candidates based on a computation amount, and thus to reduce processing load and/or processing time.

For example, in the encoder according to the aspect of the present disclosure, each of the one or more second transform basis candidates may be included in the plurality of first transform basis candidates.

In this way, the plurality of first transform basis candidates can include the one or more second transform basis candidates. In other words, it is possible to prepare the one or more second transform basis candidates by excluding at least one transform basis from the plurality of first transform basis candidates. For example, when a block size is large, it is possible to prevent a transform basis which requires a large computation amount from being used by excluding the transform basis which requires the large computation amount from the first transform basis candidates. In this way, it is possible to reduce processing load and/or processing time more effectively. In addition, it is also possible to reduce the circuit scale of a dedicated circuit by excluding the transform basis which requires the large computation amount which is used for a large block size from the transform basis candidates.

Furthermore, a decoder according to an aspect of the present disclosure is a decoder which inverse-transforms a current block to be decoded in an encoded image to decode the current block includes circuitry and memory. The circuitry, using the memory: determines a plurality of first inverse transform basis candidates and inverse-transforms the current block using an inverse transform basis included in the plurality of first inverse transform basis candidates determined, when the current block has a first size; and determines one or more second inverse transform basis candidates different from the plurality of first inverse transform basis candidates and inverse-transforms the current block using an inverse transform basis included in the one or more inverse second transform basis candidates determined, when the current block has a second size larger than the first size.

With the decoder, it is possible to switch inverse transform basis candidates depending on the block size of the current block, and thus to use the more suitable inverse transform basis. For example, it is possible to reduce cost for signalling transform basis information if reducing the number of inverse transform basis candidates when the current block has the second size larger than the first size.

For example, in the decoder according to the aspect of the present disclosure, the number of the one or more second inverse transform basis candidates may be smaller than the number of the plurality of first inverse transform basis candidates.

In this way, it is possible to reduce the number of inverse transform basis candidates when the current block has the second size larger than the first size, and thus can reduce cost for signalling transform basis information and reduce the number of transform coefficients. Furthermore, it is also possible to exclude at least one inverse transform basis from inverse transform basis candidates based on a computation amount, and thus to reduce processing load and/or processing time.

For example, in the decoder according to the aspect of the present disclosure, each of the one or more second inverse transform basis candidates may be included in the plurality of first inverse transform basis candidates.

In this way, the plurality of first inverse transform basis candidates can include the one or more second inverse transform basis candidates. In other words, it is possible to prepare the one or more second inverse transform basis candidates by excluding the at least one inverse transform basis from the plurality of first inverse transform basis candidates. For example, when the block size of a current block is large, it is possible to prevent an inverse transform basis which requires a large computation amount from being used by excluding the inverse transform basis which requires the large computation amount from the first inverse transform basis candidates. In this way, it is possible to reduce processing load and/or processing time more effectively. In addition, it is also possible to reduce the circuit scale of a dedicated circuit by excluding the inverse transform basis which requires the large computation amount which is used for a large block size from the first inverse transform basis candidates.

It is to be noted that these general and specific aspects may be implemented using a system, a method, an integrated circuit, a computer program, or a computer-readable recording medium such as a CD-ROM, or any combination of systems, methods, integrated circuits, computer programs, or computer-readable recording media.

Embodiment 1

First, an outline of Embodiment 1 will be presented. Embodiment 1 is one example of an encoder and a decoder to which the processes and/or configurations presented in subsequent description of aspects of the present disclosure are applicable. Note that Embodiment 1 is merely one example of an encoder and a decoder to which the processes and/or configurations presented in the description of aspects of the present disclosure are applicable. The processes and/or configurations presented in the description of aspects of the present disclosure can also be implemented in an encoder and a decoder different from those according to Embodiment 1.

When the processes and/or configurations presented in the description of aspects of the present disclosure are applied to Embodiment 1, for example, any of the following may be performed.

(1) regarding the encoder or the decoder according to Embodiment 1, among components included in the encoder or the decoder according to Embodiment 1, substituting a component corresponding to a component presented in the description of aspects of the present disclosure with a component presented in the description of aspects of the present disclosure;

(2) regarding the encoder or the decoder according to Embodiment 1, implementing discretionary changes to functions or implemented processes performed by one or more components included in the encoder or the decoder according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoder or the decoder according to Embodiment 1, implementing discretionary changes such as addition of processes and/or substitution, removal of one or more of the processes included in the method, and then substituting a processes corresponding to a process presented in the description of aspects of the present disclosure with a process presented in the description of aspects of the present disclosure;

(4) combining one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoder or the decoder according to Embodiment 1, or a component that implements one or more processes implemented by one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoder or the decoder according to Embodiment 1, among processes included in the method, substituting a process corresponding to a process presented in the description of aspects of the present disclosure with a process presented in the description of aspects of the present disclosure; and (7) combining one or more processes included in the method implemented by the encoder or the decoder according to Embodiment 1 with a process presented in the description of aspects of the present disclosure.

Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoder or the moving picture/picture decoder disclosed in Embodiment 1. Moreover, the processes and/or configurations presented in the description of aspects of the present disclosure may be independently implemented. Moreover, processes and/or configurations described in different aspects may be combined.

[Encoder Outline]

First, the encoder according to Embodiment 1 will be outlined. FIG. 1 is a block diagram illustrating a functional configuration of encoder 100 according to Embodiment 1. Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
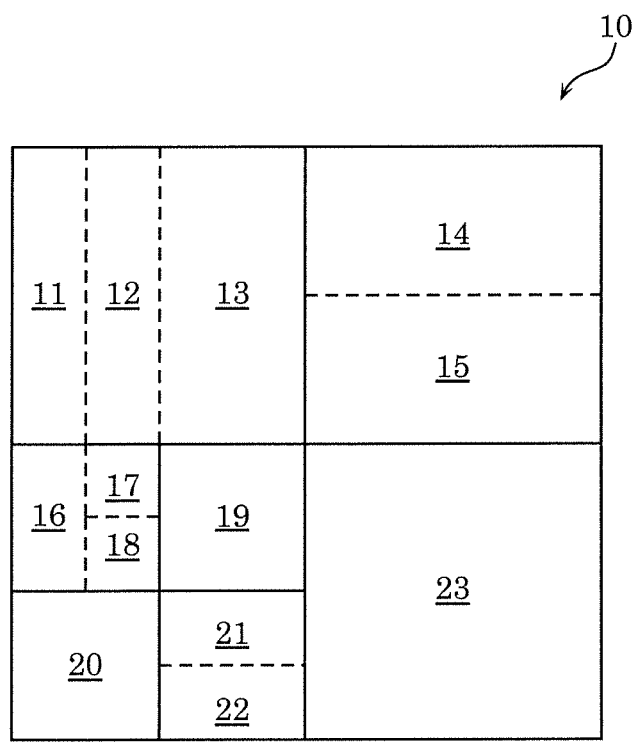
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a luma signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

Here, a separable transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

Moreover, similar to above, after an input 4×4 block is regarded as a single array including 16 components, a transform that performs a plurality of Givens rotations on the array (i.e., a Hypercube-Givens Transform) is also one example of a non-separable transform.

[Quantizer]

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

[Inverse Quantizer]

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

[Adder]

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, $C=5D+A$). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
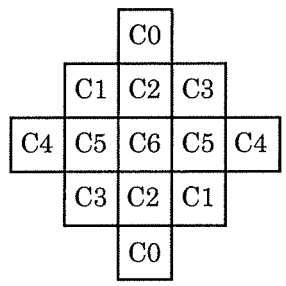
FIG. 4A illustrates one example of a filter shape used in ALF.
Figure 4B:
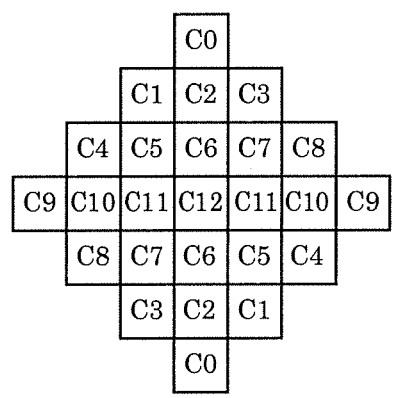
FIG. 4B illustrates another example of a filter shape used in ALF.
Figure 4C:
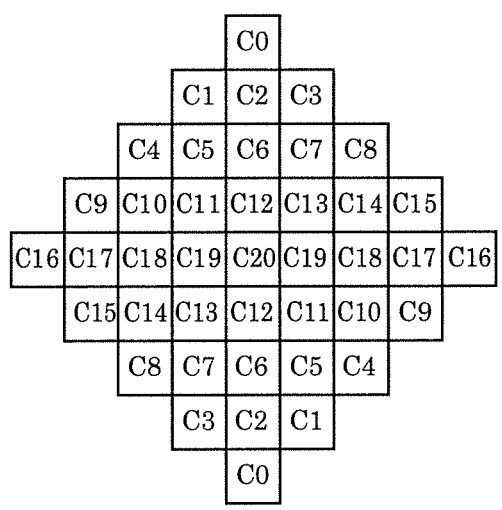
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see NPL 1).

Figure 5A:
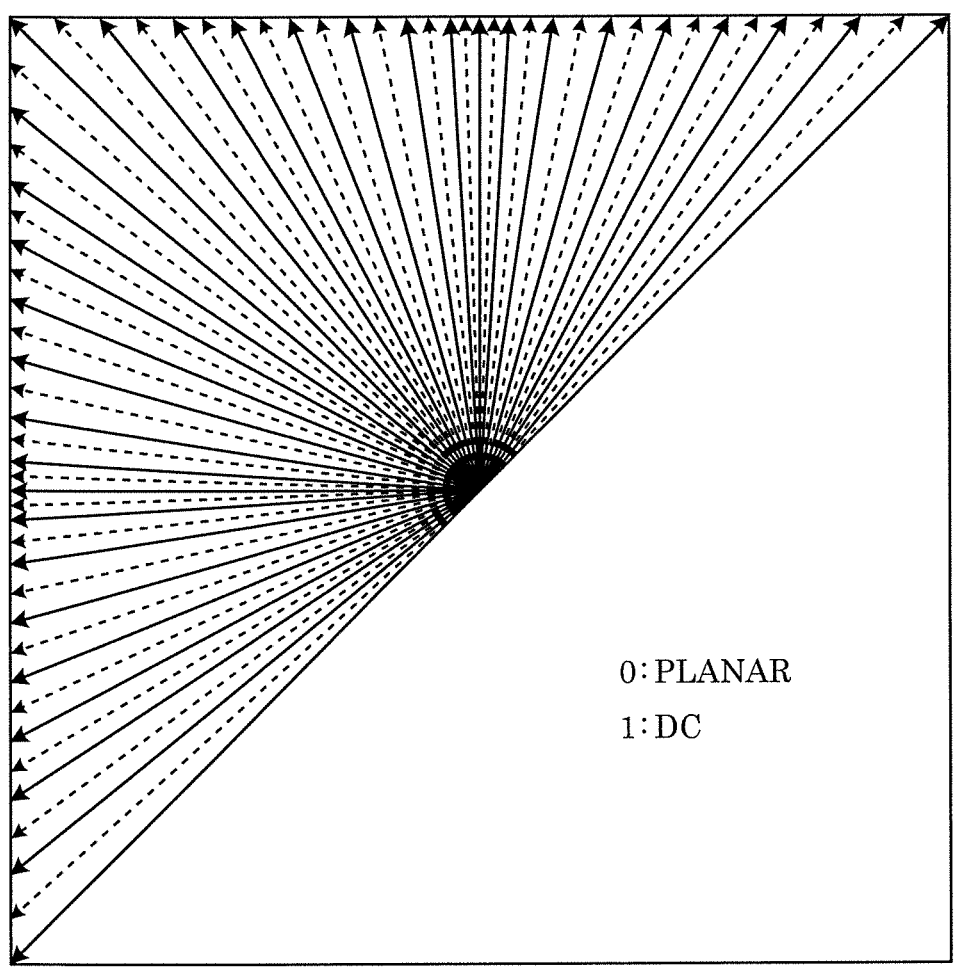
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Figure 5B:
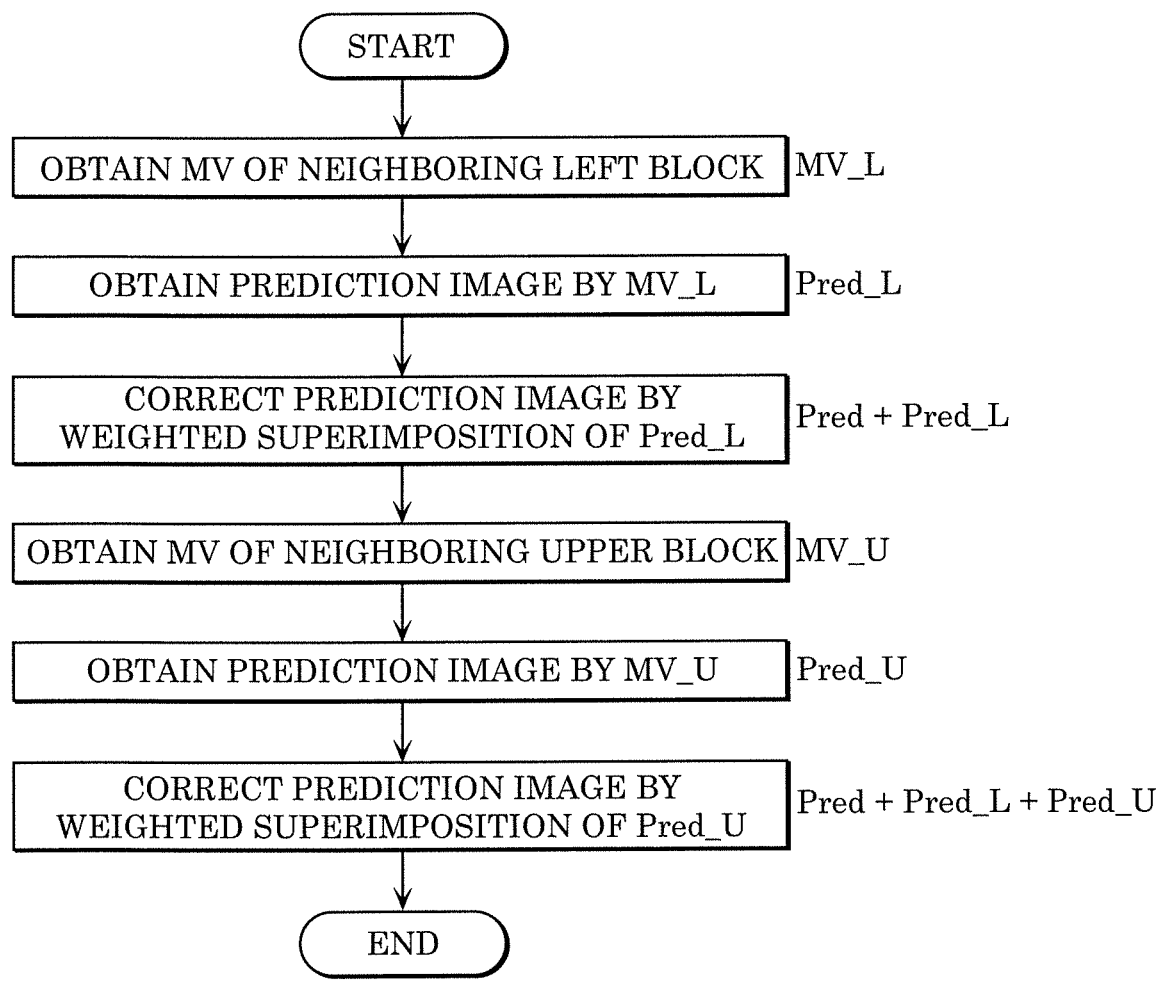
FIG. 5B is a flow chart for illustrating an outline of a prediction image correction process performed via OBMC processing.
Figure 5C:
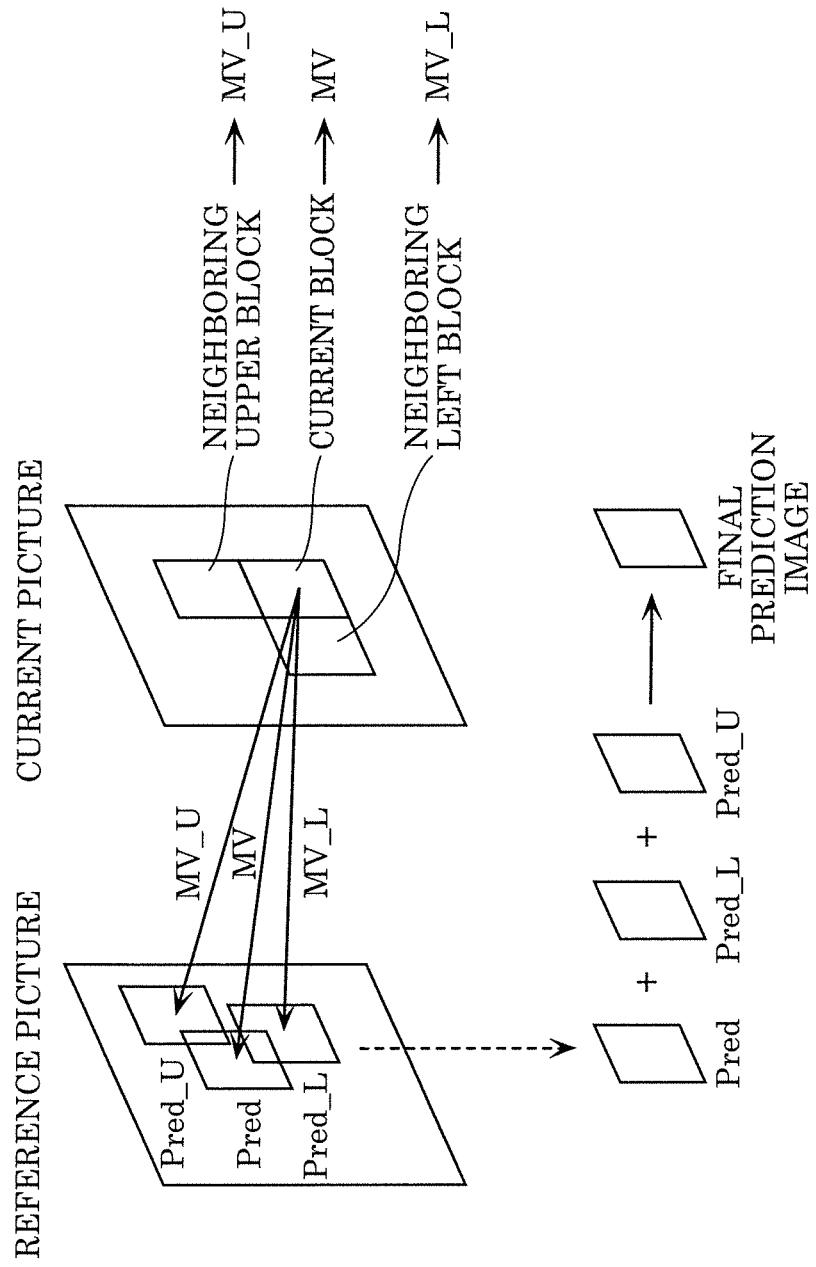
FIG. 5C is a conceptual diagram for illustrating an outline of a prediction image correction process performed via OBMC processing.

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred) is obtained through typical motion compensation using a motion vector (MV) assigned to the current block.

Next, a prediction image (Pred_L) is obtained by applying a motion vector (MV_L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further superimposed to obtain the final prediction image.

Note that the unit of the current block may be a prediction block and, alternatively, may be a sub-block obtained by further dividing the prediction block.

One example of a method for determining whether to implement OBMC processing is by using an obmc_flag, which is a signal that indicates whether to implement OBMC processing. As one specific example, the encoder determines whether the current block belongs to a region including complicated motion. The encoder sets the obmc_flag to a value of "1" when the block belongs to a region including complicated motion and implements OBMC processing when encoding, and sets the obmc_flag to a value of "0" when the block does not belong to a region including complication motion and encodes without implementing OBMC processing. The decoder switches between implementing OBMC processing or not by decoding the obmc_flag written in the stream and performing the decoding in accordance with the flag value.

Note that the motion information may be derived on the decoder side without being signalled. For example, a merge mode defined in the H.265/HEVC standard may be used. Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
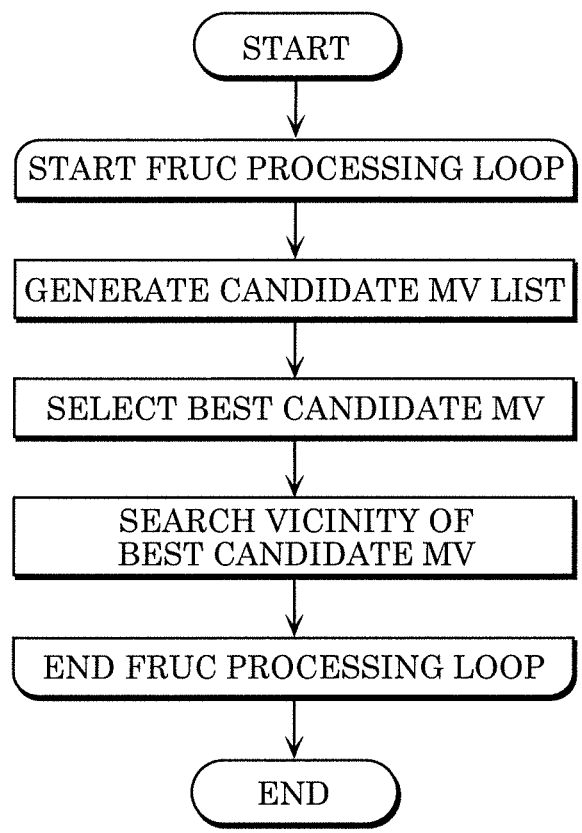
FIG. 5D illustrates one example of FRUC.

One example of FRUC processing is illustrated in FIG. 5D. First, a candidate list (a candidate list may be a merge list) of candidates each including a motion vector predictor is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block. Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a predetermined region. Note that the evaluation value may be calculated by using some other information in addition to the difference.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

Figure 6:
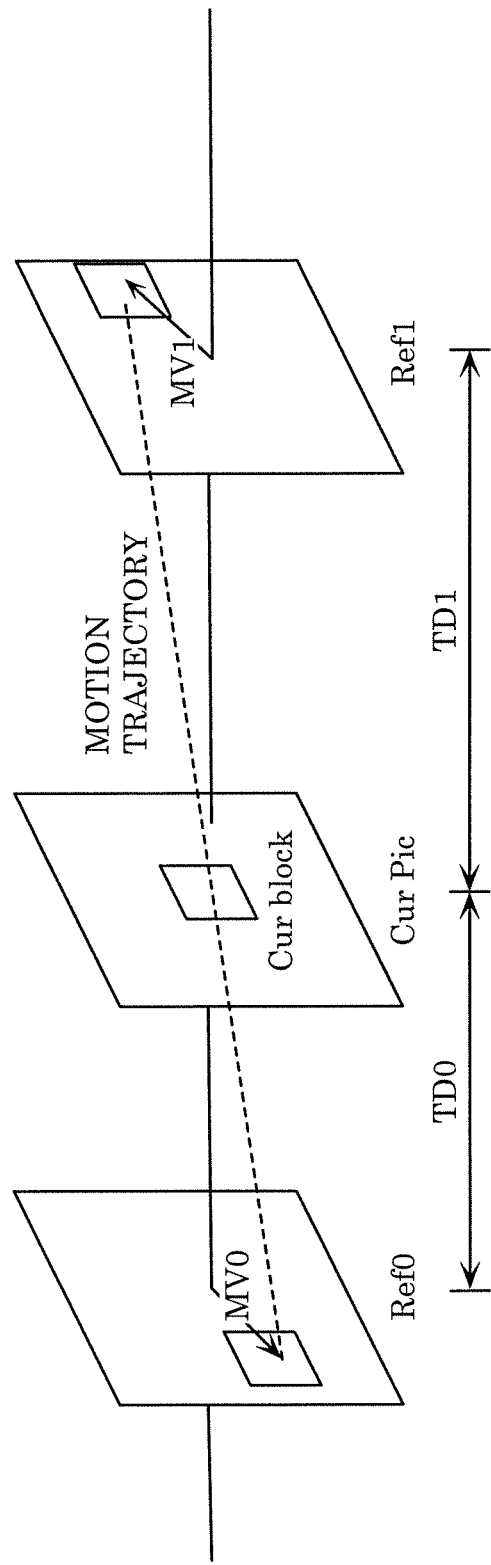
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (i) a reconstructed image in a specified position in a first encoded reference picture (Ref0) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
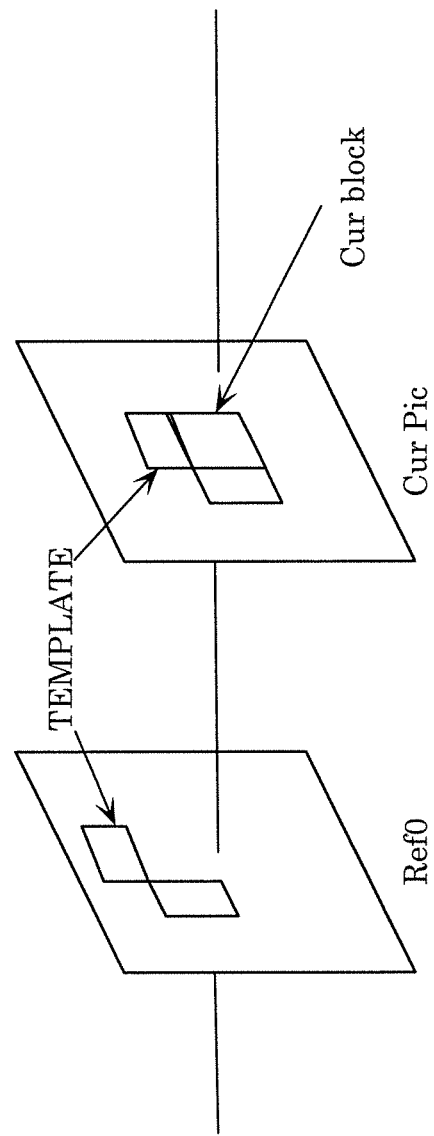
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic). More specifically, a difference between (i) a reconstructed image of an encoded region that is both or one of the neighboring left and neighboring upper region and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
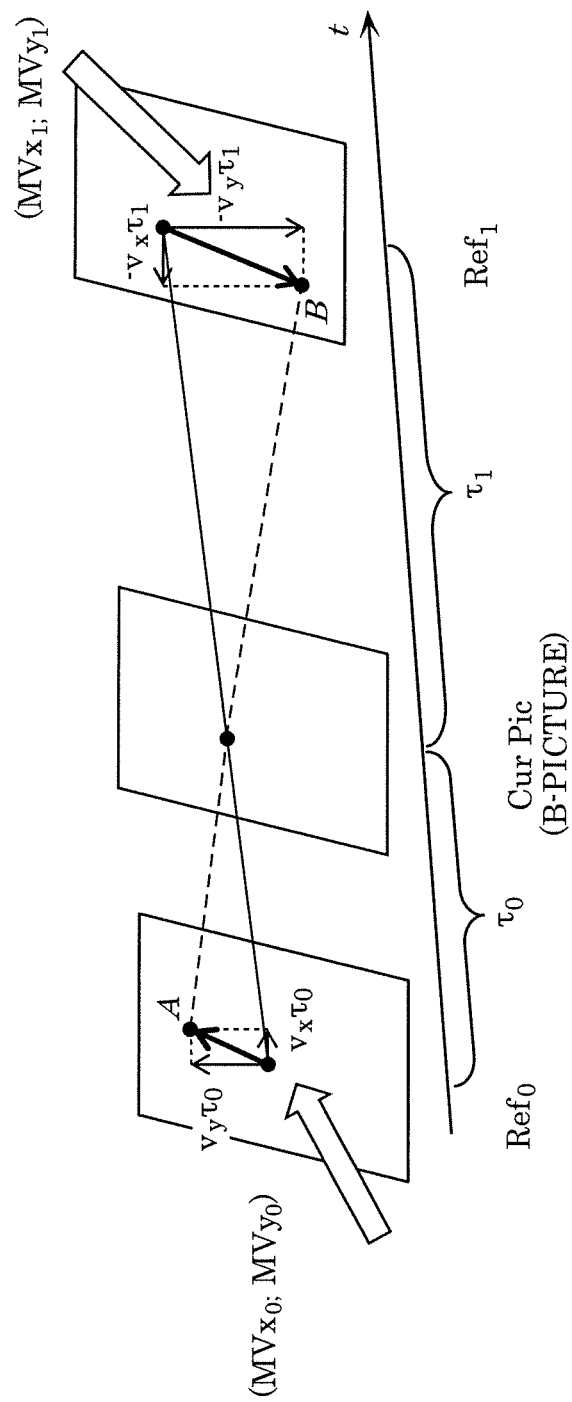
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures (Ref$_0$, Ref$_1$). (MVx$_0$, MVy$_0$) denotes a motion vector corresponding to reference picture Ref$_0$, and (MVx$_1$, MVy$_1$) denotes a motion vector corresponding to reference picture Ref$_1$.

Here, under the assumption of uniform linear motion exhibited by velocity vector $(v_x, v_y)$, (MVx$_0$, MVy$_0$) and (MVx$_1$, MVy$_1$) are represented as $(v_x\tau_0, v_y\tau_0)$ and $(-v_x\tau_1, -v_y\tau_1)$, respectively, and the following optical flow equation is given.

MATH. 1

$$\partial I^{(k)}/\partial t + v_x \partial I^{(k)}/\partial x + v_y \partial I^{(k)}/\partial y = 0. \quad (1)$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
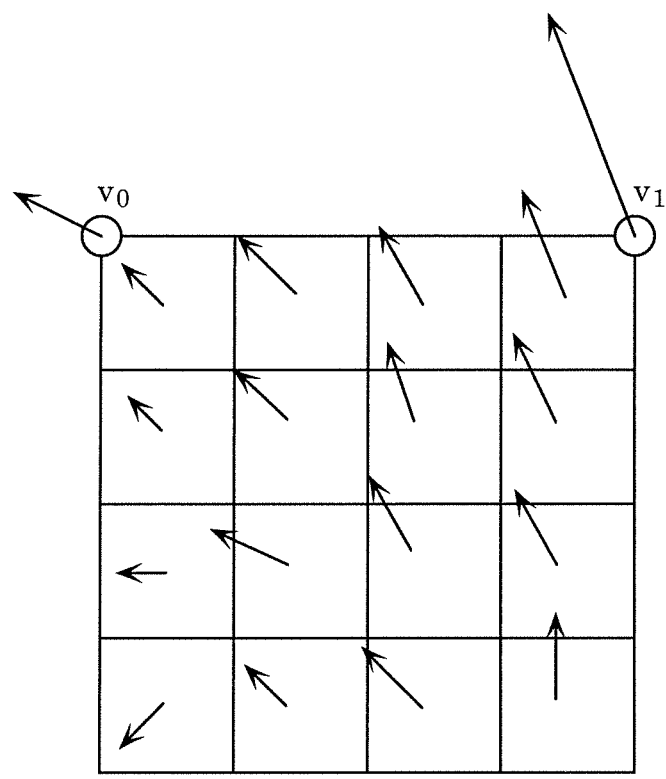
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

MATH. 2

$$\begin{cases} v_x = \dfrac{(v_{1x} - v_{0x})}{w} x - \dfrac{(v_{1y} - v_{0y})}{w} y + v_{0x} \\ v_y = \dfrac{(v_{1y} - v_{0y})}{w} x + \dfrac{(v_{1x} - v_{0x})}{w} y + v_{0y} \end{cases} \quad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

[Prediction Controller]

Prediction controller 128 selects either the intra prediction signal or the inter prediction signal, and outputs the selected prediction signal to subtractor 104 and adder 116.

Here, an example of deriving a motion vector via merge mode in a current picture will be given. FIG. 9B is for illustrating an outline of a process for deriving a motion vector via merge mode.

First, an MV predictor list in which candidate MV predictors are registered is generated. Examples of candidate MV predictors include: spatially neighboring MV predictors, which are MVs of encoded blocks positioned in the spatial vicinity of the current block; a temporally neighboring MV predictor, which is an MV of a block in an encoded reference picture that neighbors a block in the same location as the current block; a combined MV predictor, which is an MV generated by combining the MV values of the spatially neighboring MV predictor and the temporally neighboring MV predictor; and a zero MV predictor, which is an MV whose value is zero.

Next, the MV of the current block is determined by selecting one MV predictor from among the plurality of MV predictors registered in the MV predictor list.

Furthermore, in the variable-length encoder, a merge_idx, which is a signal indicating which MV predictor is selected, is written and encoded into the stream.

Note that the MV predictors registered in the MV predictor list illustrated in FIG. 9B constitute one example. The number of MV predictors registered in the MV predictor list may be different from the number illustrated in FIG. 9B, the MV predictors registered in the MV predictor list may omit one or more of the types of MV predictors given in the example in FIG. 9B, and the MV predictors registered in the MV predictor list may include one or more types of MV predictors in addition to and different from the types given in the example in FIG. 9B.

Note that the final MV may be determined by performing DMVR processing (to be described later) by using the MV of the current block derived via merge mode.

Here, an example of determining an MV by using DMVR processing will be given.

Figure 9C:
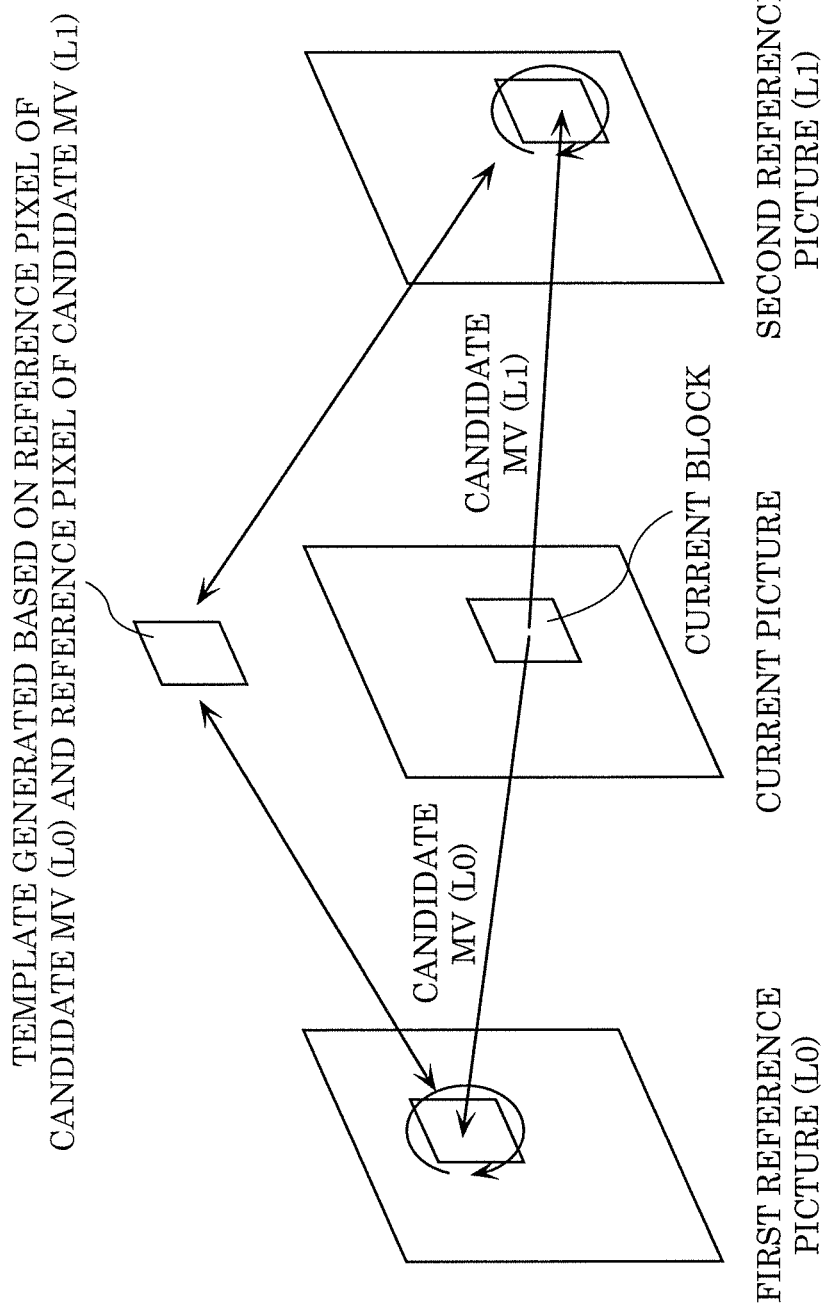
FIG. 9C is a conceptual diagram for illustrating an outline of DMVR processing.

FIG. 9C is a conceptual diagram for illustrating an outline of DMVR processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the L1 direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value.

Note that the outlines of the processes described here are fundamentally the same in both the encoder and the decoder.

Note that processing other than the processing exactly as described above may be used, so long as the processing is capable of deriving the final MV by searching the surroundings of the candidate MV.

Here, an example of a mode that generates a prediction image by using LIC processing will be given.

Figure 9D:
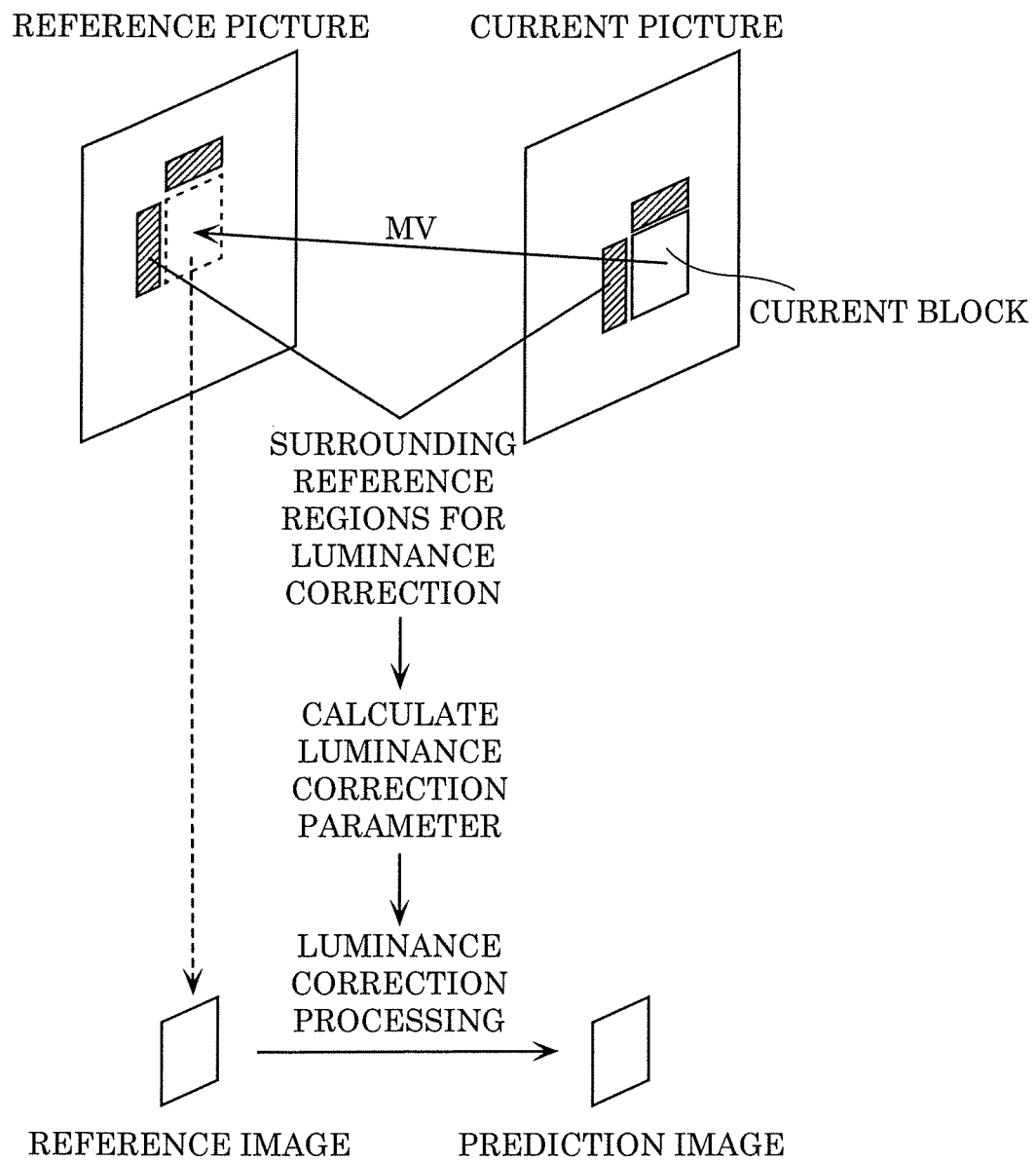
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left neighboring reference region and the encoded upper neighboring reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing. As one specific example, the encoder determines whether the current block belongs to a region of luminance change. The encoder sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoder switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoder side.

[Decoder Outline]

Figure 10:
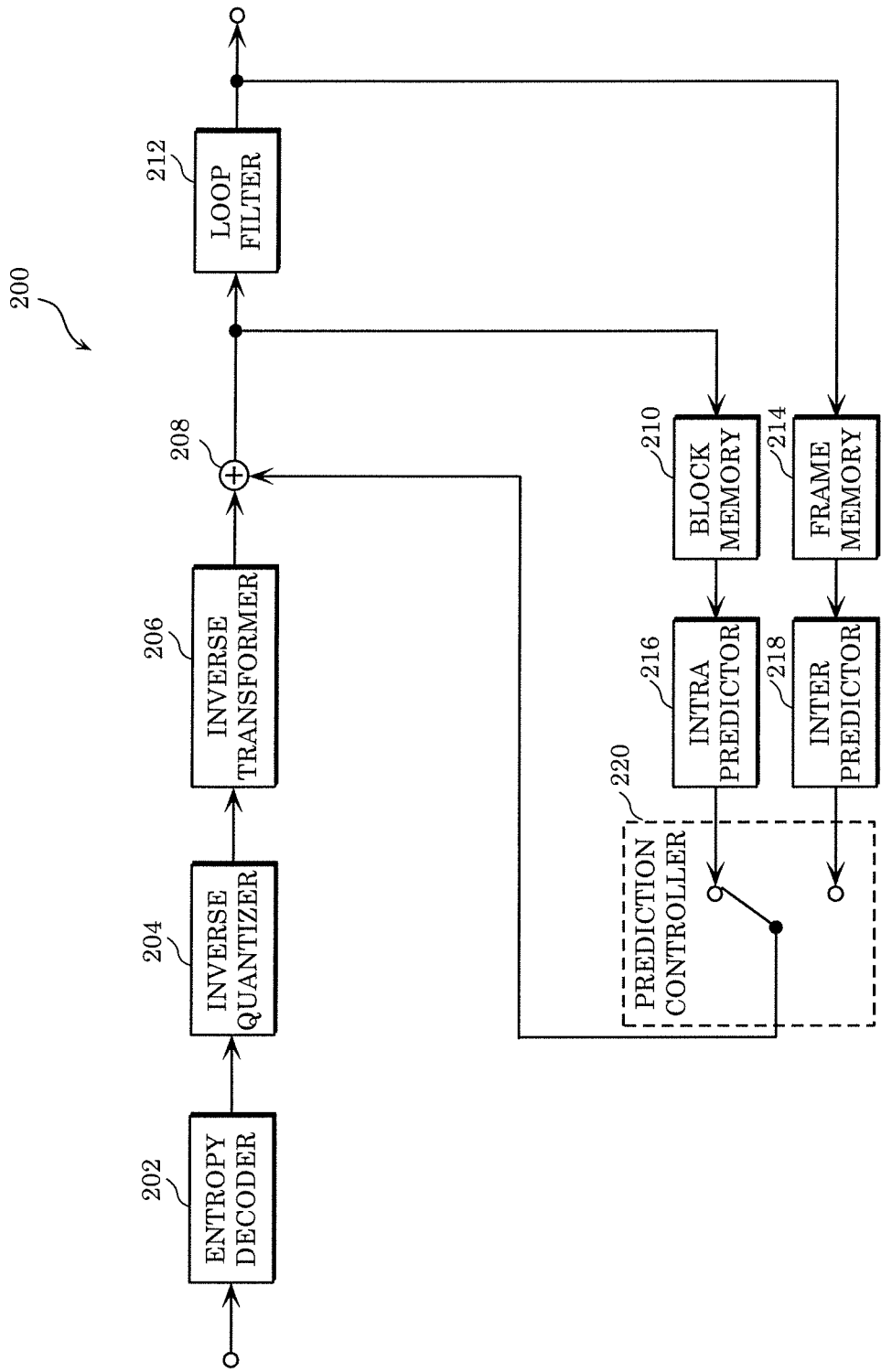
FIG. 10 is a block diagram illustrating a functional configuration of a decoder according to Embodiment 1.

Next, a decoder capable of decoding an encoded signal (encoded bitstream) output from encoder 100 will be described. FIG. 10 is a block diagram illustrating a functional configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

[Entropy Decoder]

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantizer]

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

[Adder]

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) for reference in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Intra Predictor]

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

[An Internal Structure of the Transformer in the Encoder]

Next, an example of an internal structure of transformer 106 in encoder 100 is described with reference to FIG. 11.

Figure 11:
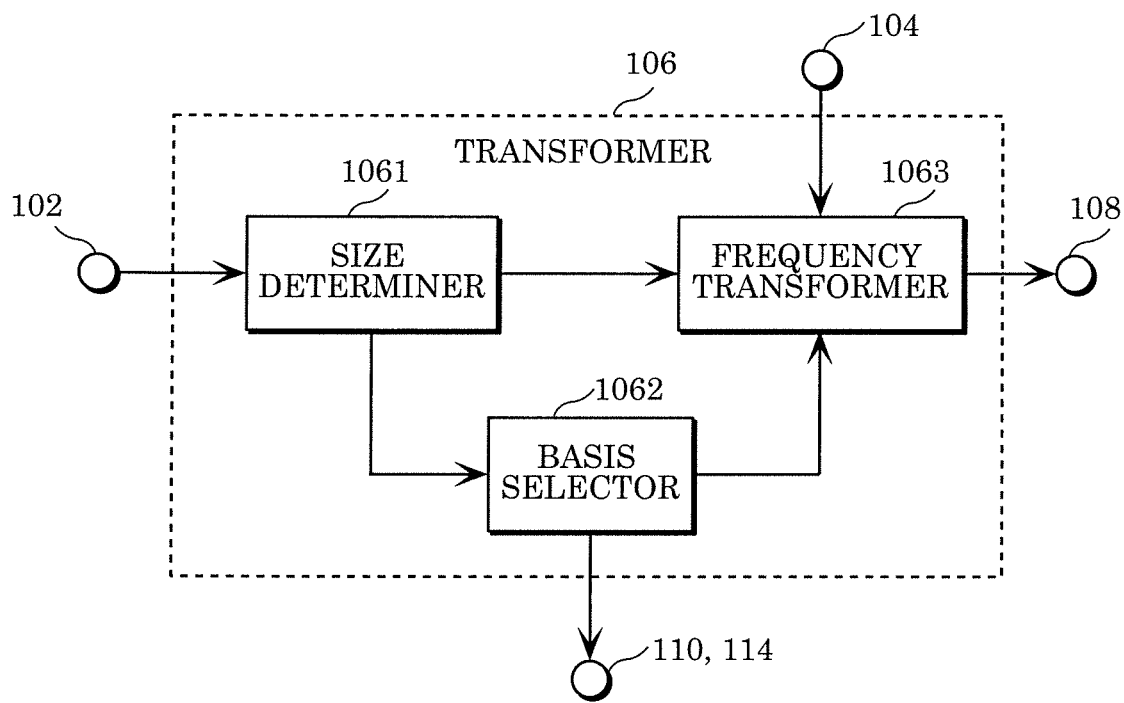
FIG. 11 is a block diagram illustrating an internal structure of a transformer in the encoder according to Embodiment 1.

FIG. 11 is a block diagram illustrating the internal structure of transformer 106 in encoder 100 according to Embodiment 1. Transformer 106 includes: size determiner 1061; basis selector 1062; and frequency transformer 1063.

Size determiner 1061 determines whether or not a current block to be encoded has a size smaller than or equal to a threshold size. As the threshold size indicating a border between block sizes for switching bases, for example, a fixed size (such as 4×4 pixels) which has been defined in the standardized standard. In addition, the threshold size may be determined based on an input image signal, or may be input from an external device or a user. For example, the threshold size may be determined based on an intra prediction mode, a quantization parameter, a prediction error, etc.

When the current block has a size larger than the threshold size, basis selector 1062 selects a basis for the current block from among a plurality of frequency transform bases. The basis is selected, for example, based on (i) a prediction error, or (ii) an evaluation value (cost) determined with consideration of the prediction error and the coding amount required for encoding the prediction error. For example, the basis that yields the smallest residual (prediction error) is selected from among a plurality of bases.

Information about the basis selected here is output to entropy encoder 110 and inverse transformer 114. Entropy encoder 110 writes the information about the selected basis onto a bitstream. The information about the basis is information indicating the selected basis, and includes, for example, values of respective elements of the selected basis. In addition, the information about the selected basis may be an index indicating the selected basis. The information about the selected basis is written onto at least one of a plurality of headers indicated in (i) to (v) of FIG. 12.

Figure 12:
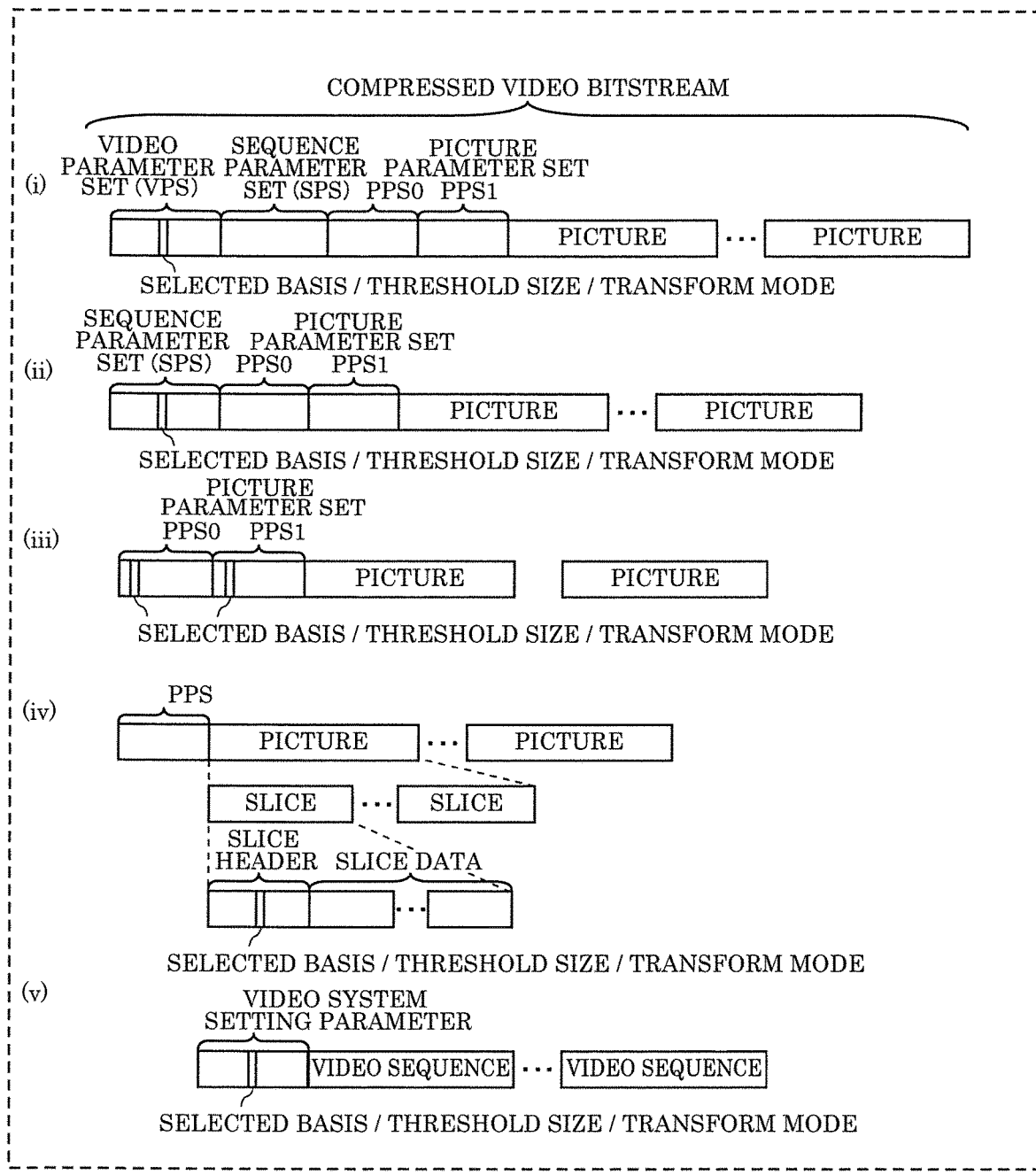
FIG. 12 is a diagram illustrating a plurality of examples of positions of selected basis information, threshold size information, or transform mode information in a bitstream in Embodiment 1 or Variation 1 or 2.

FIG. 12 illustrates examples of positions of selected basis information in a bitstream according to Embodiment 1. Specifically, in FIG. 12, (i) indicates that information about a selected basis is present in a video parameter set. In FIG. 12, (ii) indicates that the information about the selected basis is present in a sequence parameter set in a video stream. In FIG. 12, (iii) indicates that the information about the selected basis is present in a picture parameter set in a picture. In FIG. 12, (iv) indicates that the information about the selected basis is present in a slice header in a slice. In FIG. 12, (v) indicates that the information about the selected basis is present in a parameter group for setting or initializing a video system or a video decoder. When the information about the selected basis is present in each of a plurality of hierarchical layers (for example, the picture parameter set and the slice header), the information about the selected basis present in a lower layer (for example, the slice header) overwrites the information about the selected basis present in a higher layer (for example, the picture parameter set).

A plurality of frequency transform bases which can be selected are defined by the standardized standard, etc. in advance, and include, for example, bases (basis functions) of DCT-II, DCT-V, DCT-VIII, DST-I, and DST-VII illustrated in FIG. 3. It is to be noted that the plurality of frequency transform bases are not limited to the bases illustrated in FIG. 3, and may include sixteen kinds of bases of DCT types I to III and DST types I to III. In addition, the plurality of frequency transform bases may include not only orthogonal transform bases but also non-orthogonal transform bases.

When the current block has a size smaller than or equal to the threshold size, frequency transformer 1063 transforms the current block using a fixed frequency transform basis.

The fixed frequency transform basis is fixed irrespective of (i) a prediction error and (ii) an evaluation value determined with consideration of the prediction error and the coding amount required for encoding the prediction error, and is, for example, determined by the standardized standard, etc. in advance. More specifically, the fixed frequency transform basis is a basis of, for example, DST-VII, DCT-V, or the like. It is to be noted that the fixed frequency transform basis may be determined adaptively according to a residual of the current block and one of an intra prediction mode and a quantization parameter, etc. In this case, information about the fixed frequency transform basis may be written onto a bitstream.

In addition, when the current block has a size larger than the threshold size, frequency transformer 1063 transforms the current block using the basis selected by basis selector 1062.

It is to be noted that a coefficient of the current block output from frequency transformer 1063 is quantized and inverse quantized by quantizer 108 and inverse quantizer 112, respectively. Inverse transformer 114 performs inverse frequency transform on the coefficient of the current block which has been quantized and inverse quantized. At this time, inverse transformer 114 inverse transforms the current block using an inverse frequency transform basis corresponding to the frequency transform basis used by frequency transformer 1063.

[Operations Performed by the Transformer of the Encoder]

Figure 13:
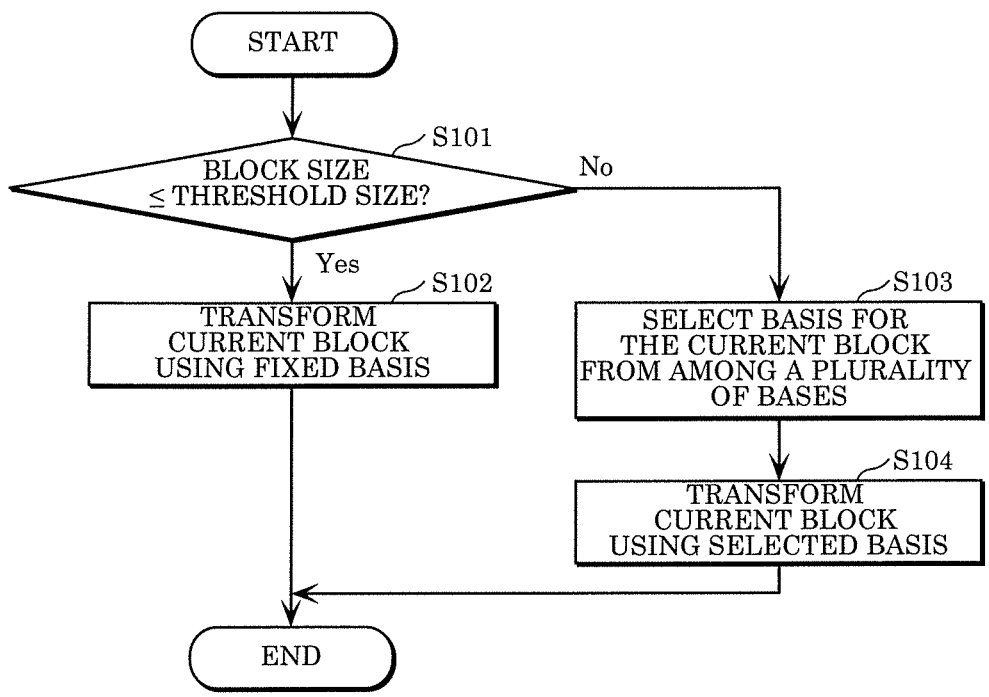
FIG. 13 is a flowchart indicating operations performed by the transformer in the encoder according to Embodiment 1.

Next, operations performed by transformer 106 configured as described above are described specifically with reference to FIG. 13. FIG. 13 is a flowchart indicating operations performed by transformer 106 in encoder 100 according to Embodiment 1.

First, size determiner 1061 determines whether or not a current block to be encoded has a size smaller than or equal to a threshold size (S101). Here, when the current block has a size smaller than or equal to a threshold size (Yes in S101), frequency transformer 1063 transforms the current block using a fixed frequency transform basis (S102). For example, frequency transformer 1063 transforms the current block having a 4×4 size using a basis of DST-VII.

When the current block has a size larger than the threshold size (No in S101), basis selector 1062 selects a basis for the current block from among a plurality of frequency transform bases (S103). For example, basis selector 1062 selects one basis from among bases of type I to type VIII, based on an evaluation value (cost) determined with consideration of the coding amount. Frequency transformer 1063 then transforms the current block using the selected basis (S104).

[An Internal Structure of a Transformer in a Decoder]

Next, a description is given of an internal structure of inverse transformer 206 of decoder 200.

Figure 14:
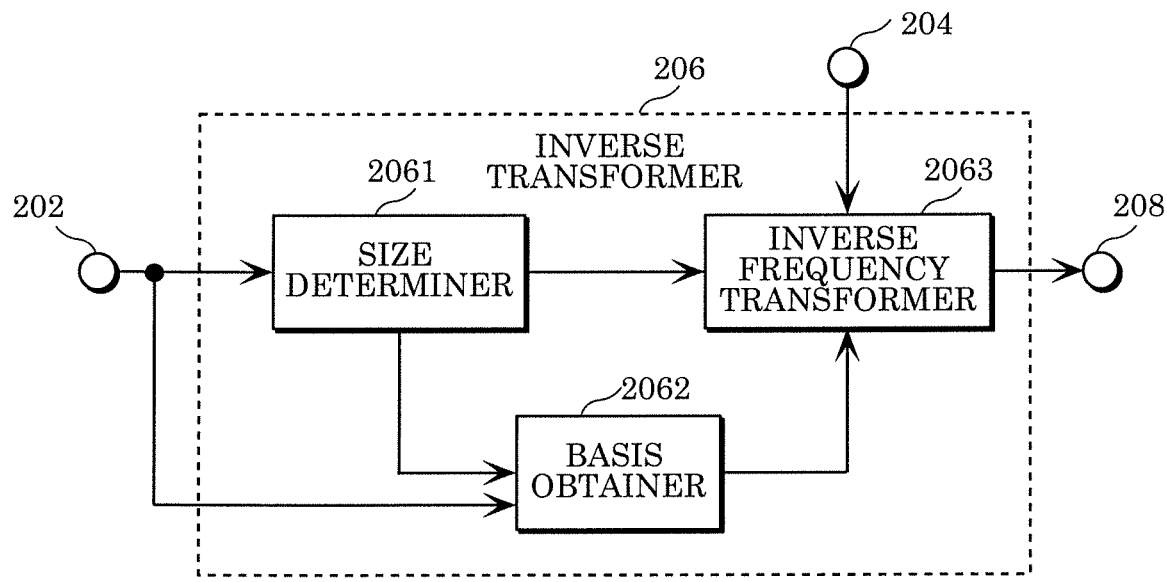
FIG. 14 is a block diagram illustrating an internal structure of an inverse transformer in the decoder according to Embodiment 1.

FIG. 14 is a block diagram illustrating an internal structure of inverse transformer 206 in decoder 200 according to Embodiment 1. Inverse transformer 206 includes: size determiner 2061; basis obtainer 2062; and inverse frequency transformer 2063.

Size determiner 2061 determines whether or not a current block to be decoded has a size smaller than or equal to a threshold size. Size determiner 2061 makes the determination, for example, based on information about the size of the current block which is obtainable from a bitstream.

When the current block has a size larger than the threshold size, basis obtainer 2062 obtains a basis for the current block based on the information about the selected basis included in the bitstream. The information about the selected basis is information for identifying an inverse frequency transform basis corresponding to the frequency transform basis selected by basis selector 1062 of encoder 100. In other words, basis obtainer 2062 obtains the inverse frequency transform basis corresponding to the frequency transform basis selected by basis selector 1062 of encoder 100.

When the current block has the size larger than the threshold value, inverse frequency transformer 2063 performs inverse frequency transform on the current block using the basis obtained by basis obtainer 2062. In addition, when the current block has the size smaller than or equal to the threshold size, inverse frequency transformer 2063 inverse transforms the current block using a fixed inverse frequency transform basis.

The fixed inverse frequency transform basis is fixed irrespective of (i) a prediction error and (ii) an evaluation value determined with consideration of the prediction error and the coding amount required for encoding the prediction error, and is, for example, determined by the standardized standard, etc. in advance. It is to be noted that information about the fixed inverse frequency transform basis may be parsed from the bitstream.

[Operations Performed by the Inverse Transformer of the Decoder]

Figure 15:
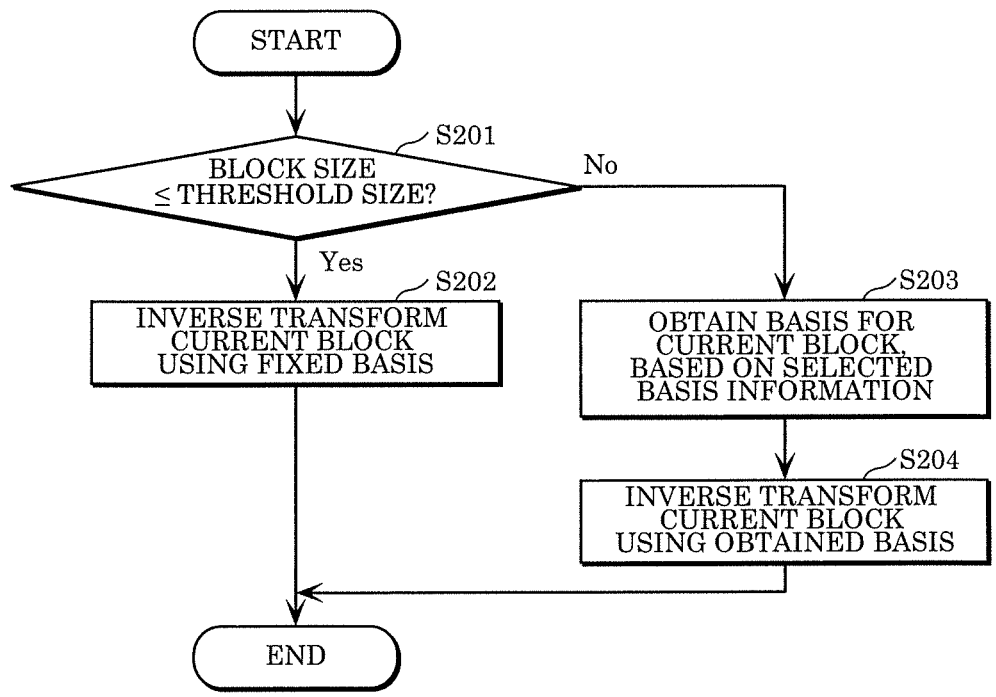
FIG. 15 is a flowchart indicating operations performed by the inverse transformer in the decoder according to Embodiment 1.

Next, operations performed by inverse transformer 206 configured as described above are described specifically with reference to FIG. 15. FIG. 15 is a flowchart indicating operations performed by inverse transformer 206 in decoder 200 according to Embodiment 1.

First, size determiner 2061 determines whether or not a current block to be decoded has a size smaller than or equal to a threshold size (S201). Here, when the current block has a size smaller than or equal to the threshold size (Yes in S201), inverse frequency transformer 2063 inverse transforms the current block using a fixed inverse frequency transform basis (S202). When the current block has a size larger than the threshold size (No in S201), basis obtainer 2062 obtains a basis for the current block based on the information about the selected basis included in a bitstream (S202). Inverse frequency transformer 2063 then inverse transforms the current block using the obtained basis (S204).

[Effects, Etc.]

As described above, transformer 106 of encoder 100 and inverse transformer 206 of decoder 200 according to this embodiment are capable of transforming and inverse transforming the current block to be encoded and the current block to be decoded using the fixed frequency transform basis and fixed inverse frequency transform basis, respectively. In this case, cost evaluation, etc. for selecting a basis is unnecessary, which reduces the load and time for encoding. When the current blocks have the size larger than the threshold size, transformer 106 and inverse transformer 206 are capable of transforming and inverse transforming the current blocks using the basis selected from among the plurality of frequency transform bases and inverse transform bases corresponding to the selected bases. In this case, the basis suitable for the current block can be used, and thus the compression efficiency can be increased. In this way, by switching the fixed basis and the selected basis according to the size of each current block, it is possible to reduce increase in the load or time for encoding while increasing the compression efficiency.

In addition, with the use of transformer 106 of encoder 100 and inverse transformer 206 of decoder 200 according to this embodiment, it is possible to include the information about the selected basis onto the bitstream when the current blocks have the size larger than the threshold size. Thus, the decoder can perform inverse frequency transform using an appropriate basis. Furthermore, when the current blocks have the size smaller than or equal to the threshold size, there is no need to include information about a basis in the bitstream. In other words, information about a basis needs to be included in the bitstream only when the current blocks have the size larger than the threshold size. Thus, the coding amount for the information about the basis can be reduced, and the compression efficiency can be increased.

Variation 1 of Embodiment 1

Next, Variation 1 of Embodiment 1 is described. This variation differs from the above embodiment in that information about a threshold size is included in a bitstream. Hereinafter, this variation is described specifically focusing on the differences from Embodiment 1 with reference to FIGS. 16 to 19.

[An Internal Structure of a Transformer in an Encoder]

Figure 16:
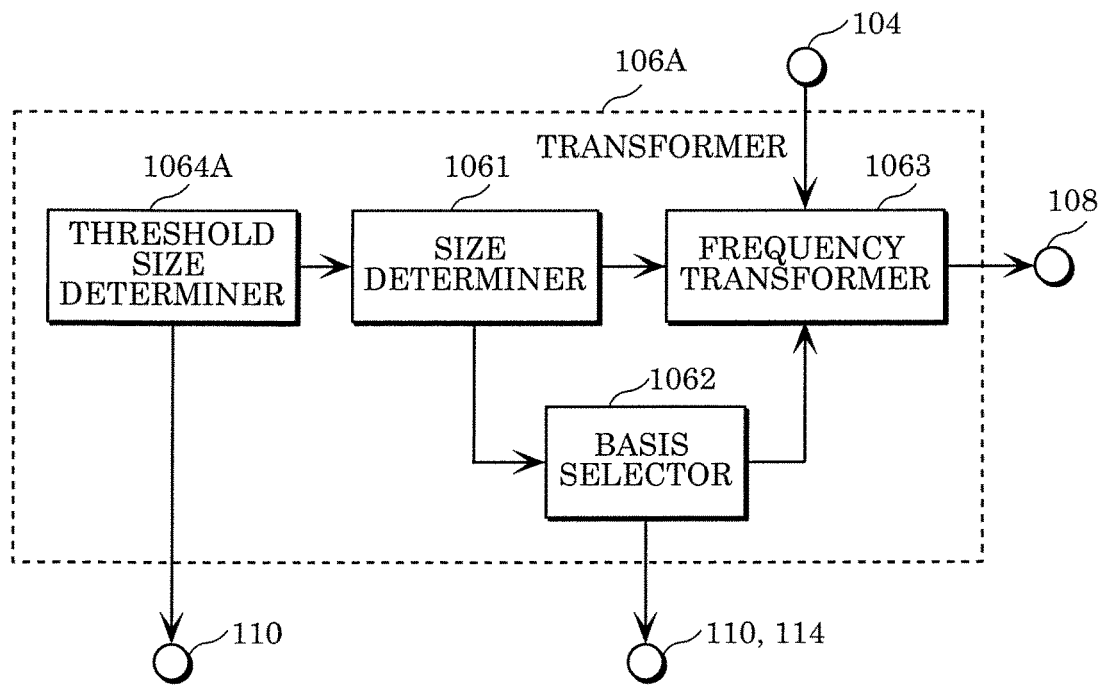
FIG. 16 is a block diagram illustrating an internal structure of a transformer in an encoder according to Variation 1 of Embodiment 1.

FIG. 16 is a block diagram illustrating an internal structure of transformer 106A in encoder 100 according to Variation 1 of Embodiment 1. Transformer 106A includes: size determiner 1061; basis selector 1062; frequency transformer 1063; and threshold size determiner 1064A.

Threshold size determiner 1064A determines a threshold size adaptively according to an input image signal, etc. The determined threshold size is used by size determiner 1061.

In addition, information about the determined threshold size is output to entropy encoder 110, and is written onto the bitstream. The information about the threshold size is information for identifying the threshold size, and is, for example, a value indicating the threshold size itself. Alternatively, the information about the threshold size may be an index indicating the threshold size. The information about the threshold size is, for example, written onto at least one of a plurality of headers indicated in (i) to (v) in FIG. 12, similarly to the case of the information about the selected basis. It is to be noted that the threshold size information does not always need to be written in the header in which the selected basis information and the threshold size information are written, and may be written in a different header.

[Operations Performed by the Transformer of the Encoder]

Figure 17:
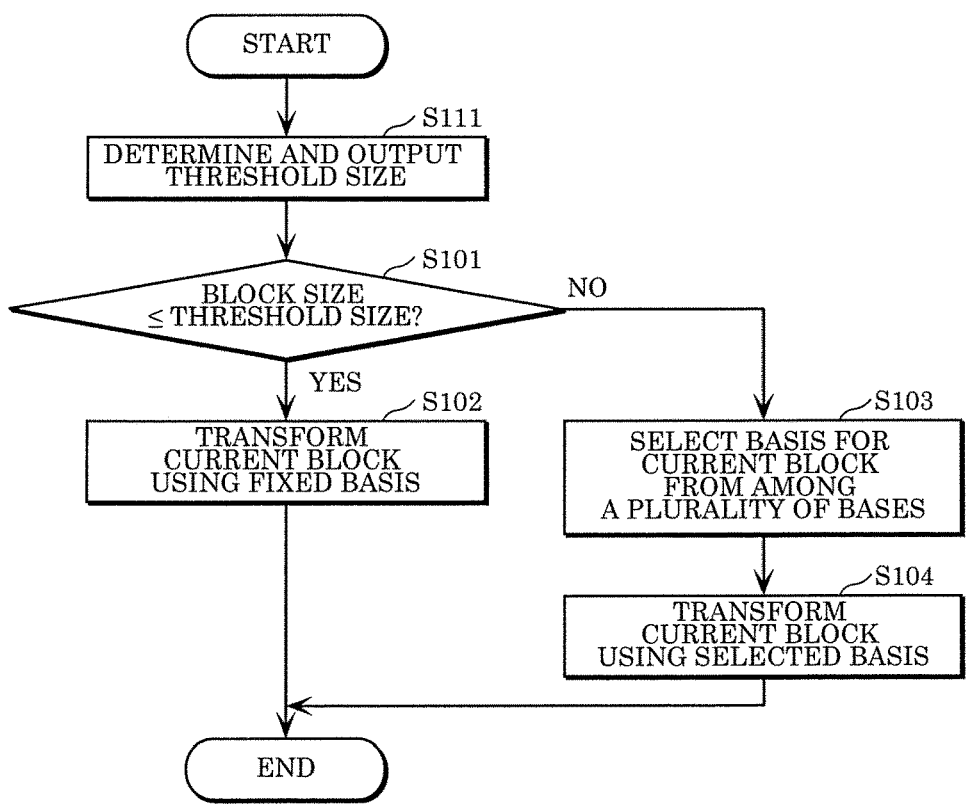
FIG. 17 is a flowchart indicating operations performed by a transformer in the encoder according to Variation 1 of Embodiment 1.

Next, operations performed by inverse transformer 106A according to this variation configured as described above are described specifically with reference to FIG. 17. FIG. 17 is a flowchart indicating operations performed by transformer 106A in encoder 100 according to Variation 1 of Embodiment 1.

First, threshold size determiner 1064A adaptively determines a threshold size, and outputs information about the determined threshold size to entropy encoder 110 (S111). Subsequently, processing in Step S101 and the subsequent steps is executed as in Embodiment 1.

[An Internal Structure of an Inverse Transformer in a Decoder]

Figure 18:
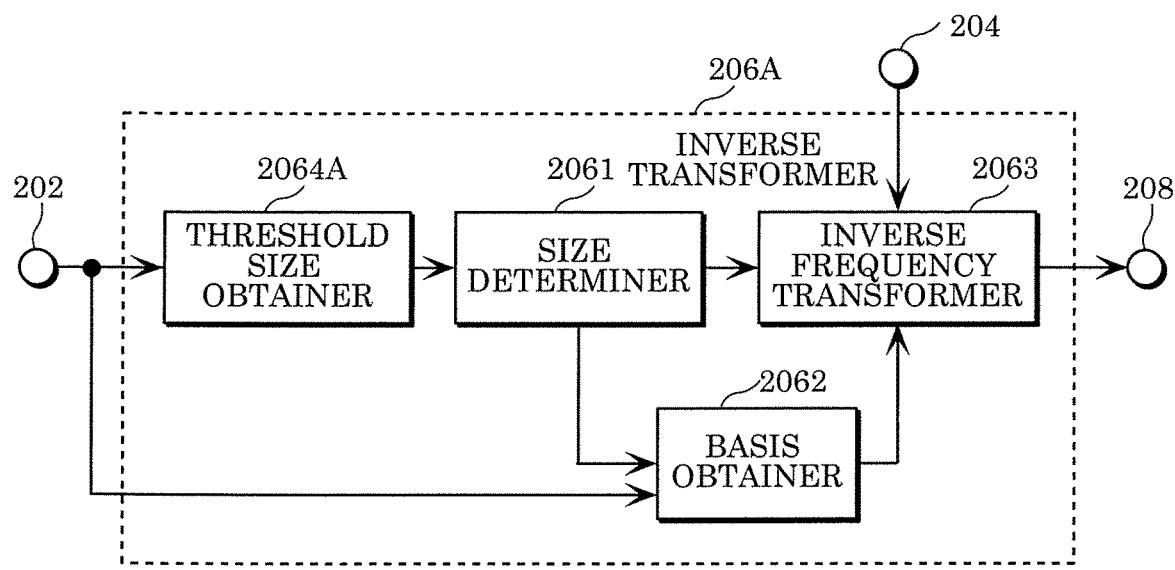
FIG. 18 is a block diagram illustrating an internal structure of an inverse transformer in a decoder according to Variation 1 of Embodiment 1.

Next, a description is given of an internal structure of inverse transformer 206A of decoder 200. FIG. 18 is a block diagram illustrating an internal structure of inverse transformer 206A in decoder 200 according to Variation 1 of Embodiment 1. Inverse transformer 206A includes: size determiner 2061; basis obtainer 2062; inverse frequency transformer 2063; and threshold size obtainer 2064A.

Threshold size obtainer 2064A obtains the threshold size from the bitstream. For example, threshold size obtainer 2064A obtains the threshold size based on the information about the threshold size parsed from the bitstream. The obtained threshold size is used by size determiner 2061.

[Operations Performed by the Inverse Transformer of the Decoder]

Figure 19:
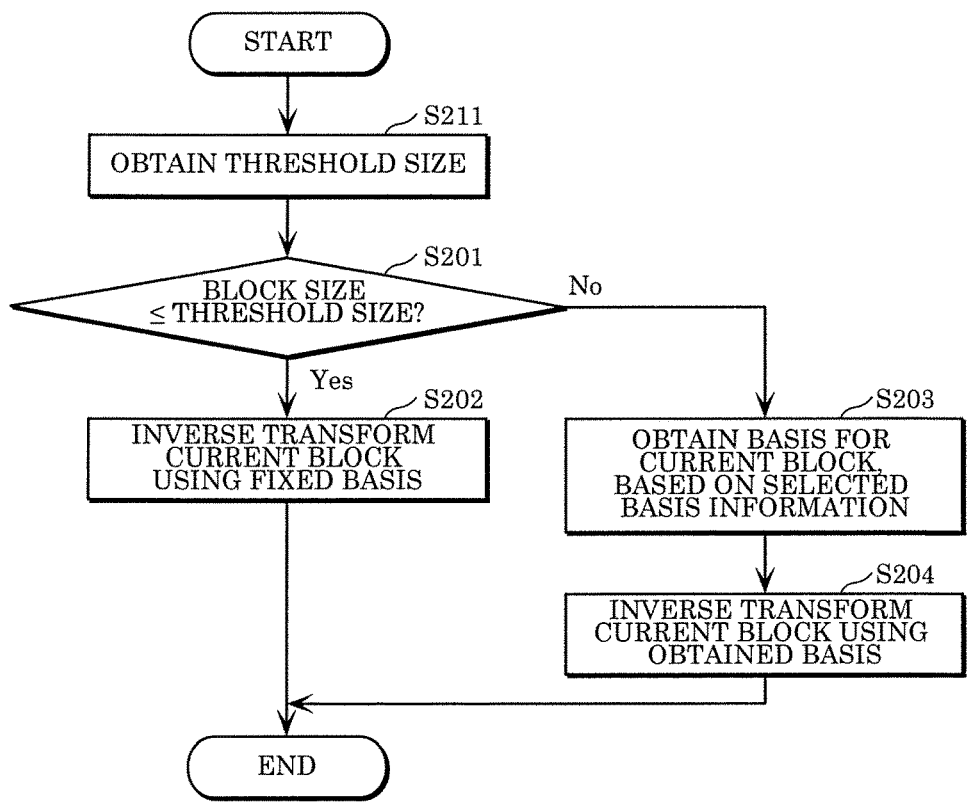
FIG. 19 is a flowchart indicating operations performed by the inverse transformer in the decoder according to Variation 1 of Embodiment 1.

Next, operations performed by inverse transformer 206A according to this variation configured as described above are described specifically with reference to FIG. 19. FIG. 19 is a flowchart indicating operations performed by inverse transformer 206A in decoder 200 according to Variation 1 of Embodiment 1.

First, threshold size obtainer 2064A obtains a threshold size from a bitstream (S211). Subsequently, processing in Step S201 and the subsequent steps is executed as in Embodiment 1.

[Effects, Etc.]

As described above, with the use of transformer 106A of encoder 100 and inverse transformer 206A of decoder 200 according to this variation, it is possible to include the information about the threshold size in the bitstream. Accordingly, the threshold size can be determined adaptively according to an input image, and compression efficiency can be further increased.

Variation 2 of Embodiment 1

Next, Variation 1 of Embodiment 1 is described. This variation differs from Variation 1 of Embodiment 1 in a frequency transform basis selecting method in the case where a current block has a size larger than a threshold size. Hereinafter, this variation is described specifically focusing on the differences from Variation 1 of Embodiment 1 with reference to FIGS. 20 to 22.

[An Internal Structure of a Transformer in an Encoder]

Figure 20:
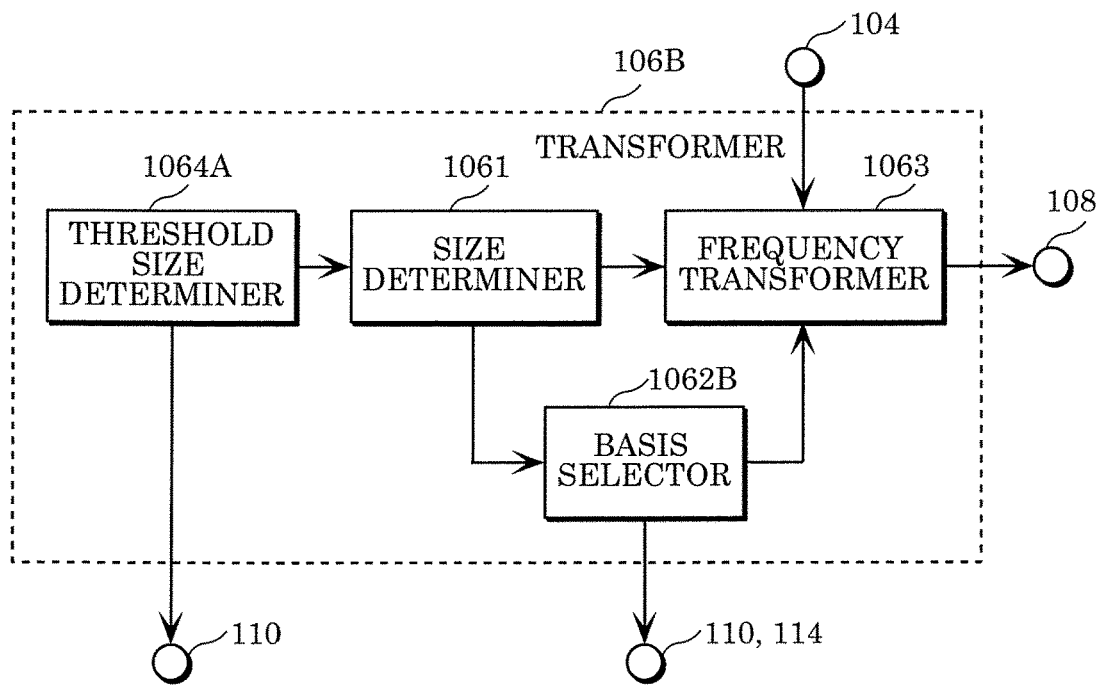
FIG. 20 is a block diagram illustrating an internal structure of a transformer in an encoder according to Variation 2 of Embodiment 1.

FIG. 20 is a block diagram illustrating an internal structure of transformer 106B in encoder 100 according to Variation 2 of Embodiment 1. Transformer 106B includes: size determiner 1061; basis selector 1062B; frequency transformer 1063; and threshold size determiner 1064A.

Basis selector 1062B selects one basis set from a plurality of basis sets based on a predetermined condition. In other words, basis selector 1062B determines whether the current block satisfies the predetermined condition, and selects the basis set based on the result of determination.

Each of the plurality of basis sets includes an arbitrary combination of a plurality of frequency transform bases. Here, the number of bases included in each of the plurality of basis sets is fewer than the number of frequency transform bases which can be selected in one of Embodiment 1 and Variation 1 thereof. In other words, the number of bases included in each basis set is limited. In addition, the basis set does not always need to include a plurality of bases, and may include only one basis.

The predetermined condition is defined by information which can be obtained without requiring cost evaluation of the current block. For example, the predetermined condition is defined according to an intra prediction mode for the current block. In addition, the predetermined condition may be defined by a random number, or may be defined by a predetermined probability for selecting each basis.

When the predetermined condition is defined by the intra prediction mode, basis selector 1062B selects a basis set, for example, in the following manner. When the intra prediction mode for the current block is a first intra prediction mode, basis selector 1062B selects a first basis set corresponding to the first intra prediction mode. When the intra prediction mode for the current block is a second intra prediction mode, basis selector 1062B selects a second basis set corresponding to the second intra prediction mode. Here, the first intra prediction mode and the second intra prediction mode are different from each other, and the first basis set and the second basis set are also different from each other.

Furthermore, basis selector 1062B selects a basis for the current block from the selected basis set. The basis is selected, for example, based on (i) a prediction error, or (ii) an evaluation value (cost) determined with consideration of the prediction error and the coding amount required for encoding the prediction error. For example, the basis that yields the smallest residual (prediction error) is selected from among a plurality of bases.

The information about the basis selected here is output to entropy encoder 110 and inverse transformer 114, and is written onto the bitstream.

[Operations Performed by the Transformer of the Encoder]

Figure 21:
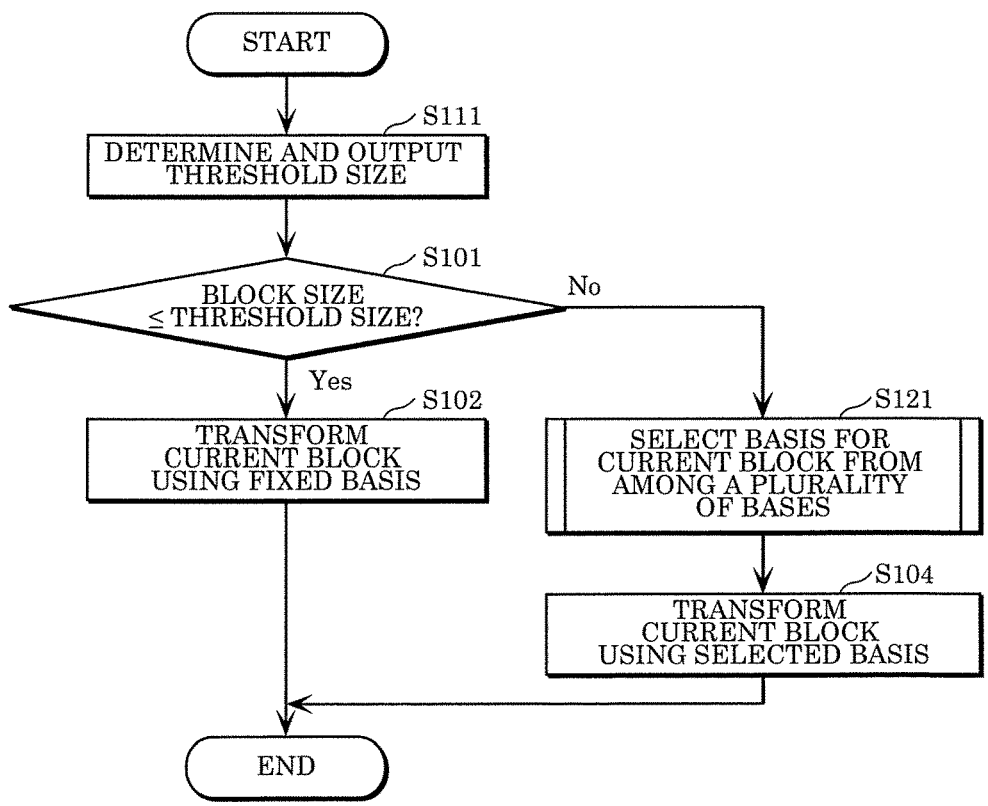
FIG. 21 is a flowchart indicating operations performed by the transformer in the encoder according to Variation 2 of Embodiment 1.
Figure 22:
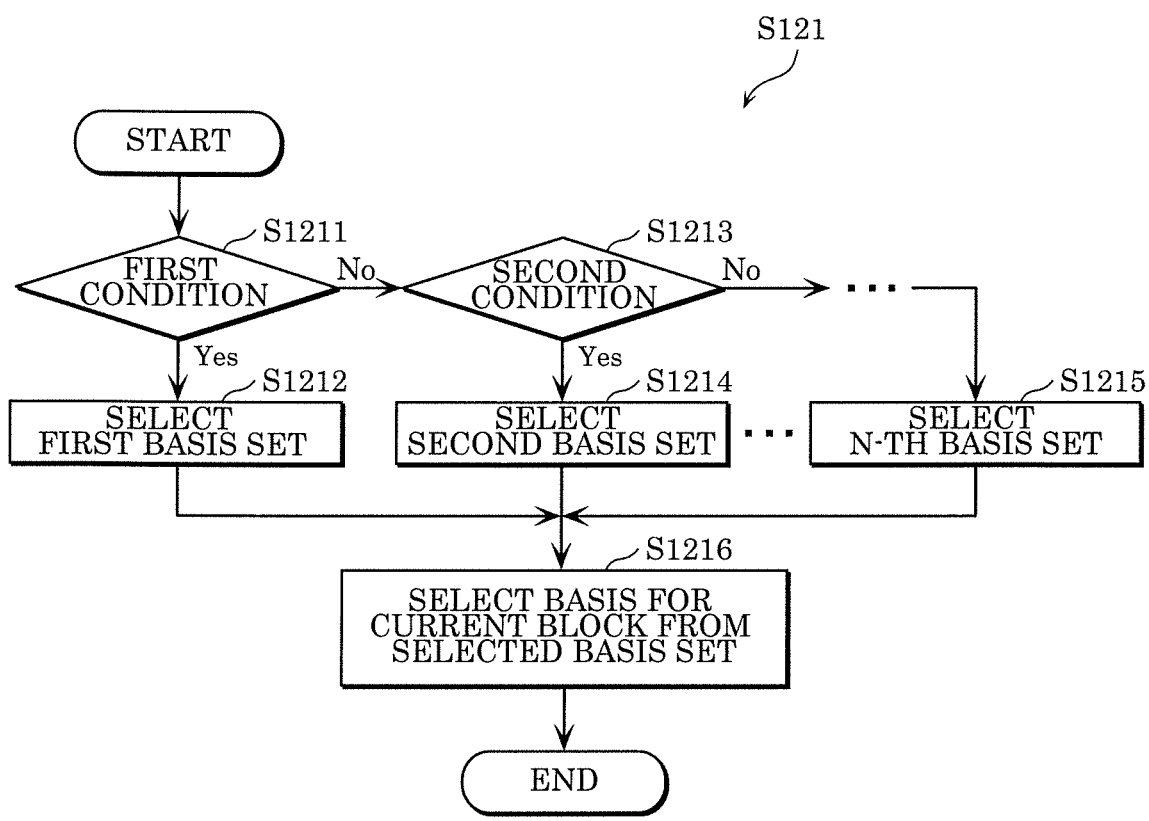
FIG. 22 is a flowchart indicating operations performed by a basis selector in the encoder according to Variation 2 of Embodiment 1.

Next, operations performed by transformer 106B configured as described above are described specifically with reference to FIGS. 21 and 22. FIG. 21 is a flowchart indicating operations performed by transformer 106B in encoder 100 according to Variation 2 of Embodiment 1.

When a current block has a size larger than a threshold size (No in S101), basis selector 1062B selects a basis for the current block from among a plurality of frequency transform bases (S121).

Here, a description is given of details of basis selection in Step S121 with reference to FIG. 22. FIG. 22 is a flowchart indicating operations performed by basis selector 1062B in encoder 100 according to Variation 2 of Embodiment 1.

Basis selector 1062B determines whether the current block satisfies a first condition (S1211). Specifically, basis selector 1062B determines, for example, whether the value of the intra prediction mode for the current block is a predetermined first value.

Here, when the current block satisfies the first condition (Yes in S1211), basis selector 1062B selects a first basis set (S1212). When the current block does not satisfy the first condition (No in S1211), basis selector 1062B determines whether the current block satisfies a second condition (S1213). Specifically, basis selector 1062B determines, for example, whether the value of the intra prediction mode for the current block is a predetermined second value.

Here, when the current block satisfies the second condition (Yes in S1213), basis selector 1062B selects a second basis set (S1214). When the current block does not satisfy the second condition (No in S1213), basis selector 1062B determines whether the current block satisfies an i-th condition ($2<i<N$, i and N are each a natural number). When the current block satisfies the i-th condition, an i-th basis set is selected. When the current block does not satisfy the (N−1)-th condition, basis selector 1062B selects an N-th basis set (S1215). In this way, any one of the first to N-th basis sets is selected.

Basis selector 1062B then selects a basis for the current block from among the selected basis set (S1216). In other words, basis selector 1062B selects the basis for the current block from the at least one basis included in the basis set. The number of bases here is smaller than the number of bases which can be selected in Embodiment 1 and Variation 1 thereof.

[Effects, Etc.]

As described above, transformer 106B of encoder 100 according to this variation is capable of selecting, based on the predetermined condition, the basis for the current block included in the basis set selected from among the plurality of basis sets. Accordingly, selectable bases can be limited according to the predetermined condition, and the load and time for encoding can be reduced.

In addition, transformer 106B of encoder 100 according to this variation is capable of selecting the basis set based on the intra prediction mode for the current block. The intra prediction mode corresponds to an intra prediction direction, and thus affects a residual distribution in the current block. Accordingly, by selecting a basis set based on the intra prediction mode, the basis set including a limited number of bases suitable for the residual distribution in the current block can be selected, and thus efficient basis selection and increase in compression efficiency can be achieved.

Variation 3 of Embodiment 1

Next, Variation 1 of Embodiment 3 is described. This variation differs from Variation 2 of Embodiment 2 in that it is possible to switch a first mode for use in the transform and inverse transform according to Variation 2 of Embodiment 1 and a second mode for other transform and inverse transform. Hereinafter, this variation is described specifically focusing on the differences from Variation 2 of Embodiment 1 with reference to FIGS. 23 to 28.

[An Internal Structure of a Transformer in an Encoder]

Figure 23:
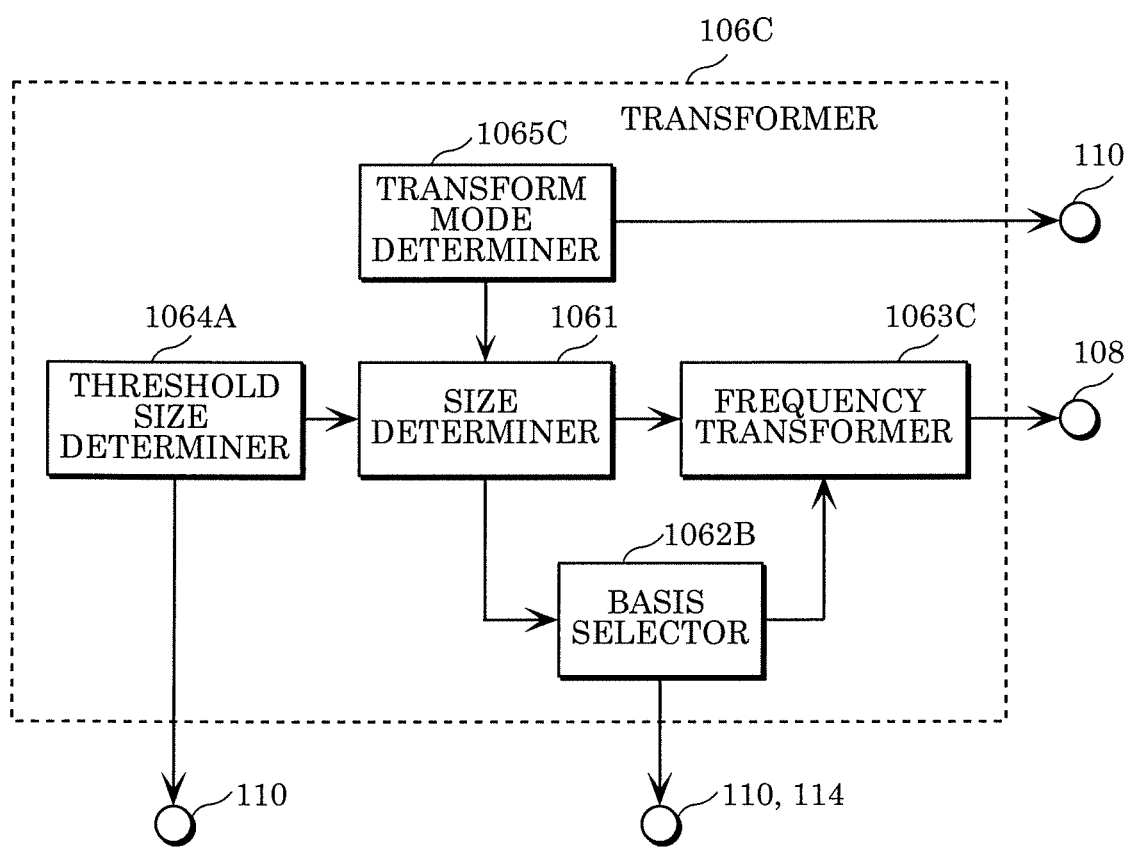
FIG. 23 is a block diagram illustrating an internal structure of a transformer in an encoder according to Variation 3 of Embodiment 1.

FIG. 23 is a block diagram illustrating an internal structure of transformer 106C in encoder 100 according to Variation 3 of Embodiment 1. Transformer 106C includes: size determiner 1061; basis selector 1062B; frequency transformer 1063; threshold size determiner 1064A; and transform mode determiner 1065C.

Transform mode determiner 1065C determines which one of the plurality of transform modes including the first transform mode and the second transform mode is to be applied to a current block. The plurality of transform modes may be different from each other in, for example, selectable bases, or in method for selecting the same selectable basis.

Information about the transform mode to be applied to the current block is output to entropy encoder 110, and is written onto a bitstream. The information about a transform mode is information for identifying the transform mode, and is, for example, a flag or an index indicating the transform mode. The information about the transform mode is, for example, written onto at least one of a plurality of headers indicated in (i) to (v) in FIG. 12, similarly to the case of the information about the selected basis and the information about the threshold size. It is to be noted that the information about the transform mode does not always need to be written in the header in which the information about the selected basis and the information about the threshold size are written, and may be written in a different header.

When the first transform mode is applied and the current block has a size larger than the threshold size, basis selector 1062B selects a basis using a selecting method similar to the selecting method in Variation 2 of Embodiment 1. Frequency transformer 1063C then transforms the current block using the basis selected by basis selector 1062B.

When the first transform mode is applied and the current block has a size smaller than or equal to the threshold size, frequency transformer 1063C transforms the current block using a first fixed basis for the first transform mode.

In this variation, the frequency transform in the first transform mode as such is referred to as first frequency transform.

When the second transform mode is applied and the current block has a size smaller than or equal to the threshold size, frequency transformer 1063C transforms the current block using a second fixed basis for the second transform mode. When the second transform mode is applied and the current block has a size larger than the threshold size, frequency transformer 1063C transforms the current block using a third fixed basis for the second transform mode. In this variation, the frequency transform in the second transform mode as such is referred to as second frequency transform.

The first frequency transform is the same as the frequency transform according to Variation 2 of Embodiment 1. The second frequency transform differs from the first frequency transform. Here, the second frequency transform uses a fixed basis even when a current block has a size larger than the threshold value.

[Operations Performed by the Transformer of the Encoder]

Figure 24:
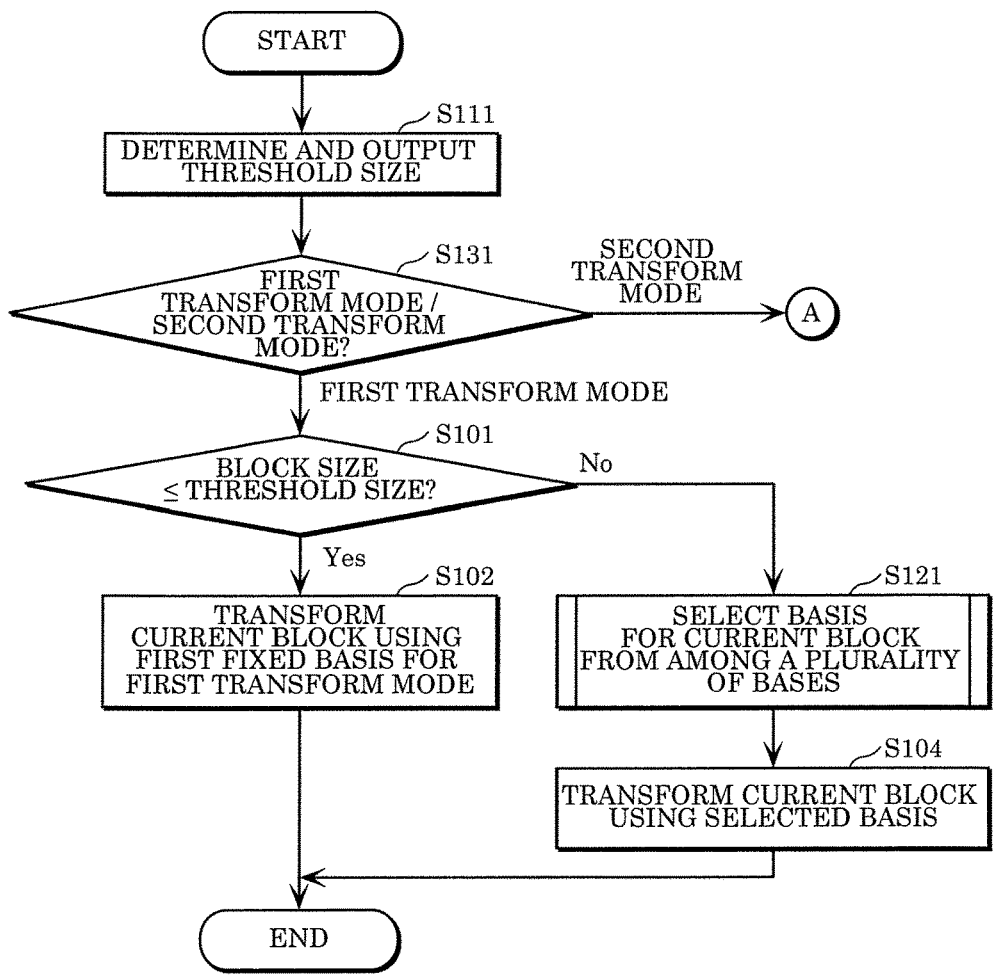
FIG. 24 is a flowchart indicating operations performed by the transformer in the encoder according to Variation 3 of Embodiment 1.
Figure 25:
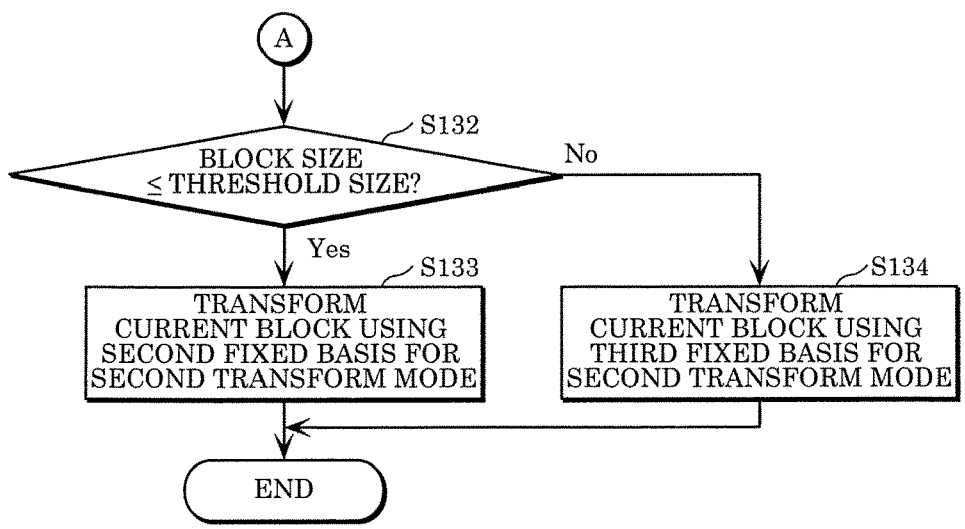
FIG. 25 is a flowchart indicating operations performed by the transformer in the encoder according to Variation 3 of Embodiment 1.

Next, operations performed by inverse transformer 106C according to this variation configured as described above are described specifically with reference to FIGS. 24 and 25. FIGS. 24 and 25 are each a flowchart indicating processing performed by transformer 106C of encoder 100 according to Variation 3 of Embodiment 1.

A threshold size is determined and output (S111) first, and then transform mode determiner 1065C determines a transform mode to be applied to a current block, and outputs the transform mode to entropy encoder 110 (S131).

Here, when the determined transform mode is a first transform mode (the first transform mode in S131), processing in Step S101 and the subsequent steps is executed. When the determined transform mode is a second transform mode (the second transform mode in S131), processing in Steps S132 to S134 in FIG. 25 is executed.

Specifically, size determiner 1061 determines whether or not the current block has a size smaller than or equal to the threshold size (S132). Here, when the current block has a size smaller than or equal to the threshold size (Yes in S132), frequency transformer 1063C transforms the current block using the second fixed basis for the second transform mode (S133). When the current block has a size larger than the threshold value (No in S132), frequency transformer 1063C transforms the current block using the third fixed basis for the second transform mode.

As the fixed basis, it is possible to use any one of eight kinds of bases of type I to type III defined based on a border condition or symmetry in each of DCT and DST. For example, it is possible to use a basis of DST-VII as the first fixed basis for the first transform mode, a basis of DCT-V as the second fixed basis for the second transform mode, and a basis of DCT-II as the third fixed basis for the second transform mode. It is to be noted that the second or third fixed basis for the second transform mode may be the same as the first fixed basis for the first transform mode.

[An Internal Structure of an Inverse Transformer in a Decoder]

Figure 26:
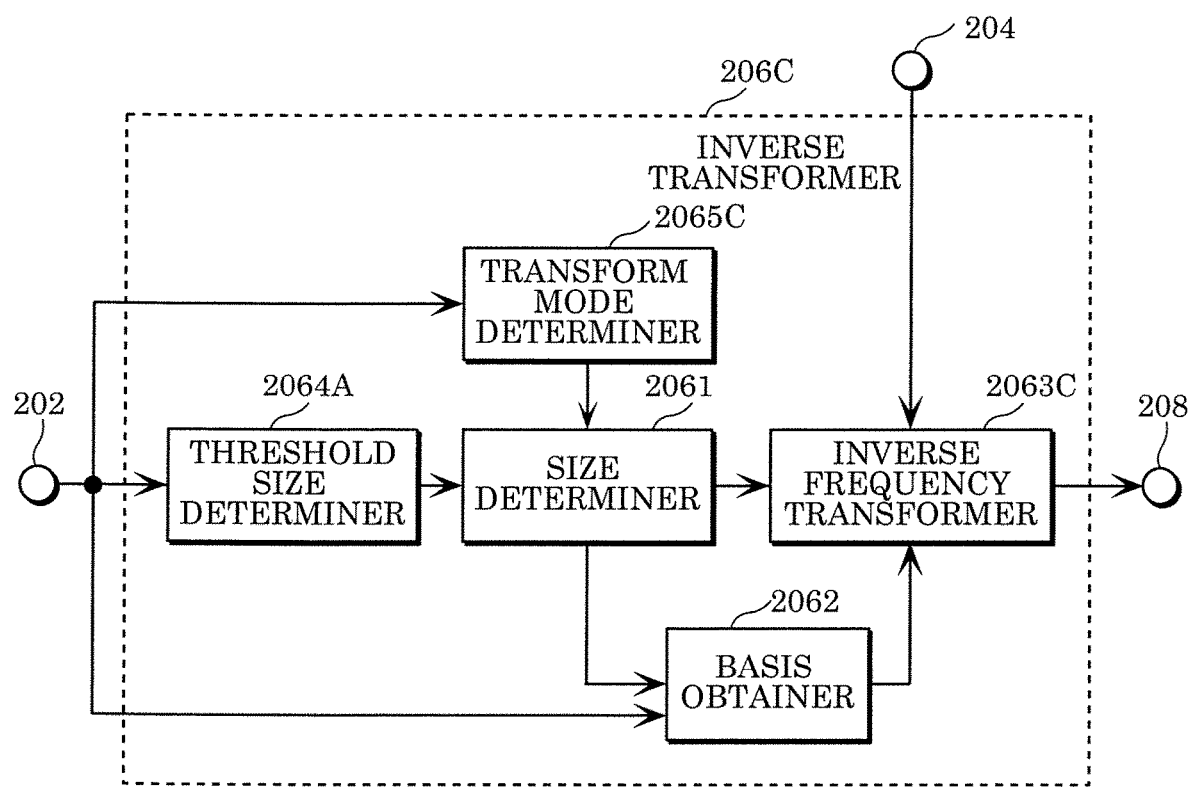
FIG. 26 is a block diagram illustrating an internal structure of an inverse transformer in a decoder according to Variation 3 of Embodiment 1.

Next, a description is given of an internal structure of inverse transformer 206C of decoder 200. FIG. 26 is a block diagram illustrating an internal structure of inverse transformer 206C in decoder 200 according to Variation 3 of Embodiment 1. Inverse transformer 206C includes: size determiner 2061; basis obtainer 2062; inverse frequency transformer 2063C; threshold size obtainer 2064A; and transform mode determiner 2065C.

Transform mode determiner 2065C determines which one of the plurality of transform modes including the first transform mode and the second transform mode is to be applied to the current block. For example, transform mode determiner 2065C determines a transform mode based on information about the determined transform mode parsed from the bitstream by entropy decoder 202.

When the first transform mode is applied and the current block has a size smaller than or equal to the threshold size, inverse frequency transformer 2063C inverse transforms the current block using the first fixed basis for the first transform mode. When the first transform mode is applied and the current block has a size smaller than or equal to the threshold size, inverse frequency transformer 2063C inverse transforms the current block using a basis obtained by basis obtainer 2062. In this variation, the frequency transform in the first transform mode as such is referred to as first inverse frequency transform.

When the second transform mode is applied and the current block has a size smaller than or equal to the threshold size, inverse frequency transformer 2063C inverse transforms the current block using the second fixed basis for the second transform mode. When the second transform mode is applied and the current block has a size smaller than or equal to the threshold size, inverse frequency transformer 2063C inverse transforms the current block using the third fixed basis for the third transform mode. In this variation, the inverse frequency transform in the second transform mode as such is referred to as second inverse frequency transform.

[Operations Performed by the Inverse Transformer of the Decoder]

Figure 27:
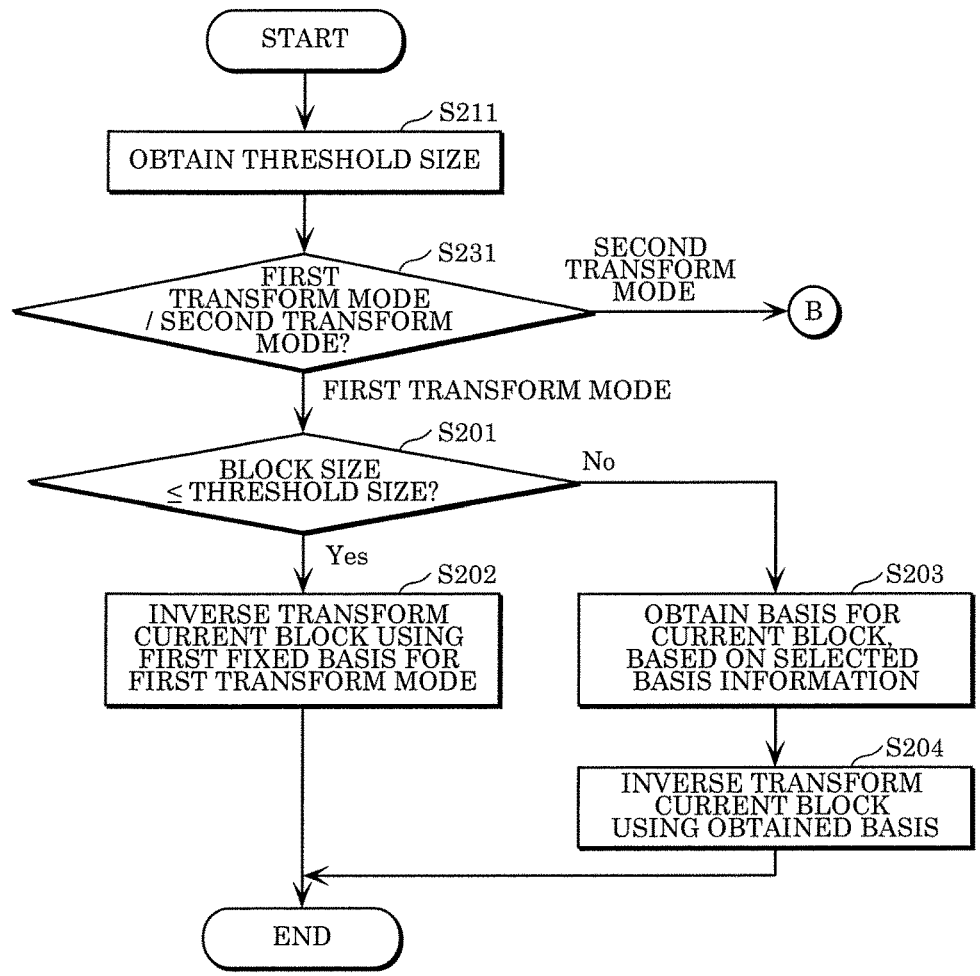
FIG. 27 is a flowchart indicating operations performed by the inverse transformer in the decoder according to Variation 3 of Embodiment 1.
Figure 28:
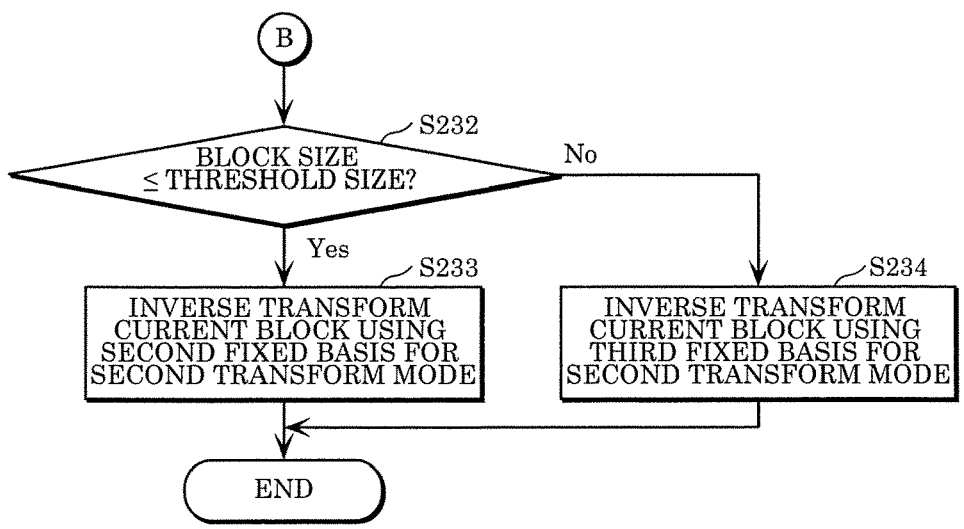
FIG. 28 is a flowchart indicating operations performed by the inverse transformer in the decoder according to Variation 3 of Embodiment 1.

Next, operations performed by inverse transformer 206C according to this variation configured as described above are described specifically with reference to FIGS. 27 and 28.

FIGS. 27 and 28 are each a flowchart indicating processing performed by transformer 206C of decoder 200 according to Variation 3 of Embodiment 1.

First, threshold size obtainer 2064A obtains a threshold size from a bitstream (S211). Subsequently, transform mode determiner 2065C determines which one of a plurality of transform modes is to be applied to the current block (S231). Here, when the first transform mode is applied (the first transform mode in S231), processing in Step S201 and the subsequent steps is executed. When the second transform mode is applied (the second transform mode in S231), size determiner 2061 determines whether or not the current block has a size smaller than or equal to the threshold size (S232).

Here, when the current block has a size smaller than or equal to the threshold size (Yes in S232), inverse frequency transformer 2063C inverse transforms the current block using the second fixed basis for the second transform mode (S233). When the current block has a size larger than the threshold size (No in S232), inverse frequency transformer 2063C inverse transforms the current block using the third fixed basis for the second transform mode (S234).

[Effects, Etc.]

As described above, transformer 106C of encoder 100 and inverse transformer 206C of decoder 200 according to this variation are capable of switching the plurality of frequency transforms using transform modes. Accordingly, efficiency of frequency transform can be further increased, which enables further increase in compression efficiency.

Furthermore, with the use of transformer 106 of encoder 100 and inverse transformer 206C of decoder 200 according to this variation, it is possible to include information about a transform mode to be applied to the current block in the bitstream. Accordingly, a transform mode can be determined adaptively according to an input image, which enables further increase in compression efficiency.

It is to be noted that, although this variation is described focusing on the cases in which the two transform modes (the first transform mode and the second transform mode) are used, the number of transform modes is not limited to two. For example, in addition to the first transform mode and the second transform mode, a third transform mode and/or a fourth transform mode may be used.

Variation 4 of Embodiment 1

Next, Variation 1 of Embodiment 4 is described. This variation differs from Embodiment 1 in that transform basis candidates/inverse transform basis candidates are determined according to the size of a current block, and that a basis for the current block is selected from the determined transform basis candidates. This variation is described below focusing on differences from Embodiment 1. It is to be noted that the configurations of encoder 100 and decoder 200 according to this variation are identical or similar to those in Embodiment 1, and thus are not illustrated in the drawings and not described here.

[Operations Performed by the Transformer of the Encoder]

Figures 29, 30:
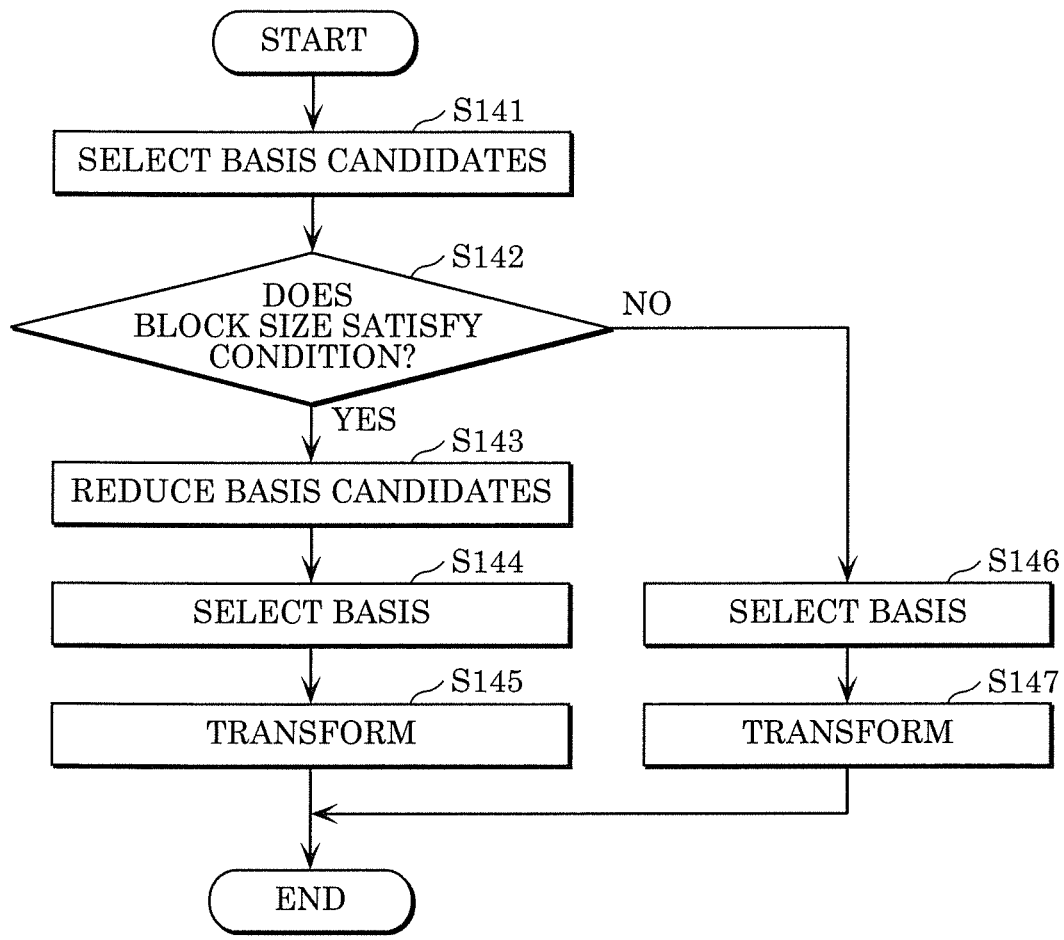
FIG. 29 is a flowchart indicating operations performed by a transformer of an encoder according to Variation 4 of Embodiment 1.
FIG. 30 is a diagram indicating transform bases which enable fast computation for block sizes.

First, operations performed by transformer 106 of encoder 100 according to this variation are specifically described with reference to FIG. 29. FIG. 29 is a flowchart indicating the operations performed by transformer 106 of encoder 100 according to Variation 4 of Embodiment 1.

First, transformer 106 selects a plurality of transform basis candidates (S141). For example, transformer 106 may select a plurality of transform basis candidates which have been defined in advance in a standard, or the like. In addition, for example, transformer 106 may adaptively select a plurality of transform basis candidates. The plurality of transform basis candidates selected here corresponds to a plurality of first transform basis candidates.

After the plurality of first transform basis candidates is selected, transformer 106 determines whether the block size of the current block satisfies a predetermined condition (S142). The predetermined condition here means a condition regarding a predetermined block size. The predetermined condition may be defined in advance in a standard, etc., or may be adaptively determined based on a cost etc. Specifically, for example, the predetermined condition indicates that the block size is larger than or equal to and/or smaller than or equal to a threshold size. In addition, for example, the predetermined condition may indicate that the block size is the same or different from a predetermined size (for example, 16×16). In addition, the predetermined condition may be a condition in which these conditions are combined.

Here, in the case where the block size of the current block satisfies the predetermined condition (Yes in S142), transformer 106 may reduce the number of the plurality of transform basis candidates selected in Step S141 (S143). In other words, transformer 106 excludes at least one transform basis from the selected plurality of transform basis candidates. At this time, the reduced number of transform basis candidates may be 1 or may be 2 or more. The transform basis candidate(s) reduced in this way correspond(s) to one or more second transform basis candidates. Transformer 106 selects a transform basis for a current block to be encoded from the transform basis candidates (that are the one or more second transform basis candidates) reduced in Step S143 (S144). Specifically, transformer 106 selects a transform basis based on an evaluation value (cost) with consideration of a prediction error, or a prediction error and the coding amount of the prediction error.

Transformer 106 transforms a current block to be encoded using the transform basis selected in Step S144 (S145), and ends the processing. Specifically, for example, transformer 106 performs frequency transform on residuals of a block to be encoded using the selected transform basis to generate frequency coefficients.

In the opposite case where the block size of the current block does not satisfy the predetermined condition (No in S142), transformer 106 selects a transform basis for the current block from the plurality of transform basis candidates (that are the plurality of first transform basis candidates) selected in Step S141 (S146). Specifically, transformer 106 selects a transform basis based on an evaluation value (cost) with consideration of a prediction error, or a prediction error and the coding amount of the prediction error.

Transformer 106 transforms the current block using the transform basis selected in Step S146 (S147), and ends the processing. Specifically, for example, transformer 106 performs frequency transform on residuals of a block to be encoded using the selected transform basis to generate frequency coefficients.

It is to be noted that, in Step S143, the at least one transform basis excluded from the plurality of transform basis candidates may be determined, for example, based on the possibility of fast computation. In other words, transformer 106 may exclude, from the transform basis candidates, the at least one transform basis which does not enable fast computation (which does not allow use of any fast computation method) for a block having a size that satisfies a predetermined condition. Fast computation is computation which requires a smaller processing load and/or a shorter processing time than normal computation. Specifically, fast computation may be butterfly computation. In addition, fast computation may be computation which requires a computation amount smaller than or equal to a predetermined amount.

For example, when the predetermined condition used is that a block has a block size larger than a threshold size, transformer 106 determines a plurality of first transform basis candidates in the case where a current block to be encoded has a first size smaller than the threshold size. In the opposite case where the current block to be encoded has a second size larger than the threshold size, transformer 106 determines one or more second transform basis candidates. At this time, the number of the one or more second transform basis candidates is smaller than the number of the plurality of first transform basis candidates. Furthermore, each of the one or more second transform basis candidates is included in the plurality of first transform basis candidates. In other words, the one or more second transform basis candidates is a true subset of the plurality of first transform basis candidates.

[Examples of Transform Bases which Enable Fast Computation]

Here, examples of transform bases which enable fast computation for block sizes are described with reference to FIG. 30. FIG. 30 is a diagram indicating the examples of the transform bases which enable fast computation for the block sizes. In FIG. 30, the following bases are employed as transform bases: DCT-II (DCT2), DCT-V (DCT5), DCT-VIII (DCT8), DST-I (DST1), and DST-VII (DST7).

The circles in the diagram indicate the possibility of butterfly computation, that is, the circles indicate that fast computation is possible. The crosses in the diagram indicate the impossibility of butterfly computation, that is, the circles indicate that fast computation is impossible.

In FIG. 30, for example, all of DCT2, DCT5, DCT8, DST1, and DST7 enable fast computation for Size 4 and Size 8. Accordingly, when a current block to be encoded does not have a block size of at least 16×16 pixels, transform bases DCT2, DCT5, DCT8, DST1, and DST7 can be used as first transform basis candidates.

For example, in Size 16, DCT2, DCT8, DST1, and DST7 enable fast computation, but DCT5 does not enable fast computation. Accordingly, when a current block has a block size of 16×16 pixels, the transform basis DCT5 may be excluded from the plurality of transform basis candidates. In other words, when the block size is 16×16 pixels, DCT2, DCT8, DST1, and DST7 can be used as second transform basis candidates.

For example, in Size 32, DCT2 and DCT5 enable fast computation, but DCT8, DST1, and DCT7 do not enable fast computation. Accordingly, when a current block has a block size of 32×32 pixels, the transform bases DCT8, DCT1, and DST7 may be excluded from the plurality of transform basis candidates. In other words, when the block size is 32×32 pixels, DCT2 and DCT5 can be used as second transform basis candidates.

It is to be noted that the number of bits to be used for signalling for the selected transform bases may be changed when the transform basis candidates are reduced. For example, when the number of transform basis candidates is changed from 4 to 1, it is also possible to skip signalling regarding information about a transform basis to be applied to a current block (for example, information indicating whether EMT or AMT is to be applied and/or information indicating a transform basis). In addition, for example, when the number of transform basis candidates is changed from 4 to 2, not 2-bit signal but 1-bit flag may be encoded for information about a transform basis to be applied to a current block.

It is to be noted that a decoder side also needs to perform, for example, a process for making a determination regarding the block size of a current block to be decoded, and calculate how many bits are required in the signalling.

[Operations Performed by the Inverse Transformer of the Decoder]

Figure 31:
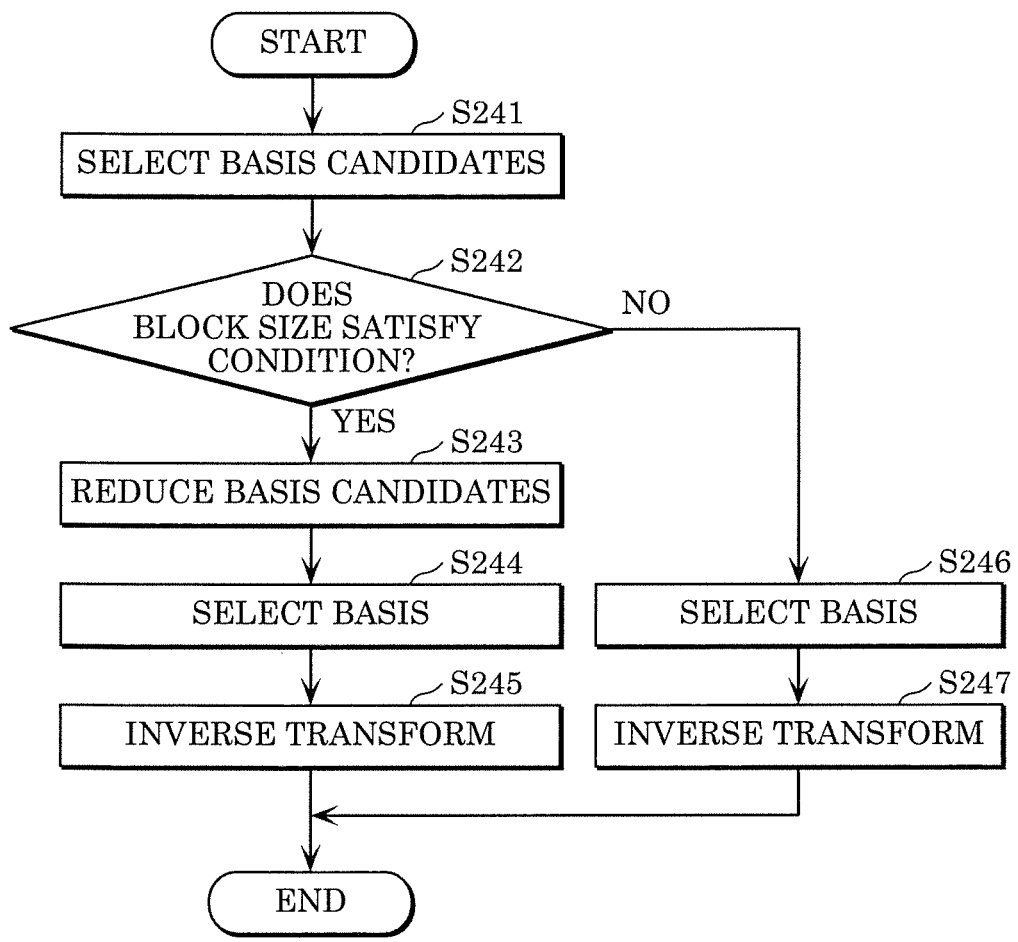
FIG. 31 is a flowchart indicating operations performed by an inverse transformer of a decoder according to Variation 4 of Embodiment 1.

Next, operations performed by inverse transformer 206 of decoder 200 according to this variation are specifically described with reference to FIG. 31. FIG. 31 is a flowchart indicating the operations performed by inverse transformer 206 of decoder 200 according to Variation 4 of Embodiment 1.

First, inverse transformer 206 selects a plurality of inverse transform basis candidates (S241). Inverse transformer 206 selects a plurality of inverse transform basis candidates corresponding to the plurality of transform basis candidates selected by transformer 106 of encoder 100. The plurality of inverse transform basis candidates selected here corresponds to a plurality of first inverse transform basis candidates.

Inverse transformer 206 determines whether a current block to be decoded has a block size that satisfies a predetermined condition (S242). The same predetermined condition as the predetermined condition used in encoder 100 is used as the predetermined condition.

Here, in the case where the block size of the current block satisfies the predetermined condition (Yes in S242), inverse transformer 206 reduces the number of the plurality of inverse transform basis candidates selected in Step S241 (S243). In other words, inverse transformer 206 excludes one or more inverse transform bases corresponding to the one or more transform bases excluded in encoder 100 from the selected plurality of inverse transform bases. The inverse transform basis candidate(s) reduced in this way correspond(s) to one or more second inverse transform basis candidates.

Inverse transformer 206 selects inverse transform bases for the current block from the inverse transform basis candidates (that are the one or more second inverse transform basis candidates) reduced in Step S243 (S244). Specifically, inverse transformer 206 selects the inverse transform basis based on information about the transform basis obtained from a bitstream.

Inverse transformer 206 inverse-transforms the current block using the inverse transform basis selected in Step S244 (S245), and ends the processing. Specifically, for example, inverse transformer 206 performs inverse frequency transform on frequency coefficients of the current block using the selected inverse transform basis to generate residuals of the current block.

In the opposite case where the block size of the current block does not satisfy the predetermined condition (No in S242), inverse transformer 206 selects an inverse transform basis for the current block from the plurality of inverse transform basis candidates (that are the plurality of first inverse transform basis candidates) selected in Step S241 (S246). Specifically, inverse transform 206 selects the inverse transform basis based on information about the transform basis obtained from a bitstream.

Inverse transformer 206 inverse-transforms the current block using the inverse transform basis selected in Step S246 (S247), and ends the processing. Specifically, for example, inverse transformer 206 performs inverse frequency transform on frequency coefficients of the current block using the selected inverse transform basis to generate residuals of the current block.

For example, in the case where the predetermined condition used is that a block has a block size larger than a threshold size, inverse transformer 206 determines a plurality of first inverse transform basis candidates when a current block to be decoded has a first size smaller than the threshold size. In the opposite case where the current block to be decoded has a second size larger than the threshold size, inverse transformer 206 determines one or more second inverse transform basis candidates. At this time, the number of the one or more second inverse transform basis candidates is smaller than the number of the plurality of first inverse transform basis candidates. In addition, each of the one or more second inverse transform basis candidates is included in the plurality of first inverse transform basis candidates. In other words, the one or more second inverse transform basis candidates is a true subset of the plurality of first inverse transform basis candidates.

[Effects, Etc.]

As described above, with encoder 100 and decoder 200 according to this variation, when the block size of the current block satisfies the predetermined condition, it is possible to reduce the transform basis candidates, and thus to reduce the cost for signalling transform basis information and reduce the number of transform coefficients by adaptively selecting the transform basis from the plurality of transform basis candidates. Furthermore, it is also possible to exclude the one or more transform bases from the transform basis candidates based on the computation amounts, and thus to reduce processing load and/or processing time.

In particular, when the current block to be encoded has the large block size, it is possible to reduce the processing load and/or processing time more effectively by excluding the one or more transform bases which require the large computation amount from the transform basis candidates. In addition, it is also possible to reduce the circuit scale of a dedicated circuit by excluding the one or more transform bases which require the large computation amount from the transform basis candidates.

Variation 5 of Embodiment 1

Next, Variation 5 of Embodiment 1 is described. This variation differs from Variation 4 in that transform basis candidates are determined for each of conditions regarding block sizes, instead of reducing the number of transform basis candidates according to the result of a determination made after a plurality of transform basis candidates are selected in advance. This variation is described below focusing on differences from Variation 4 of Embodiment 1.

[Operations Performed by the Transformer of the Encoder]

Figure 32:
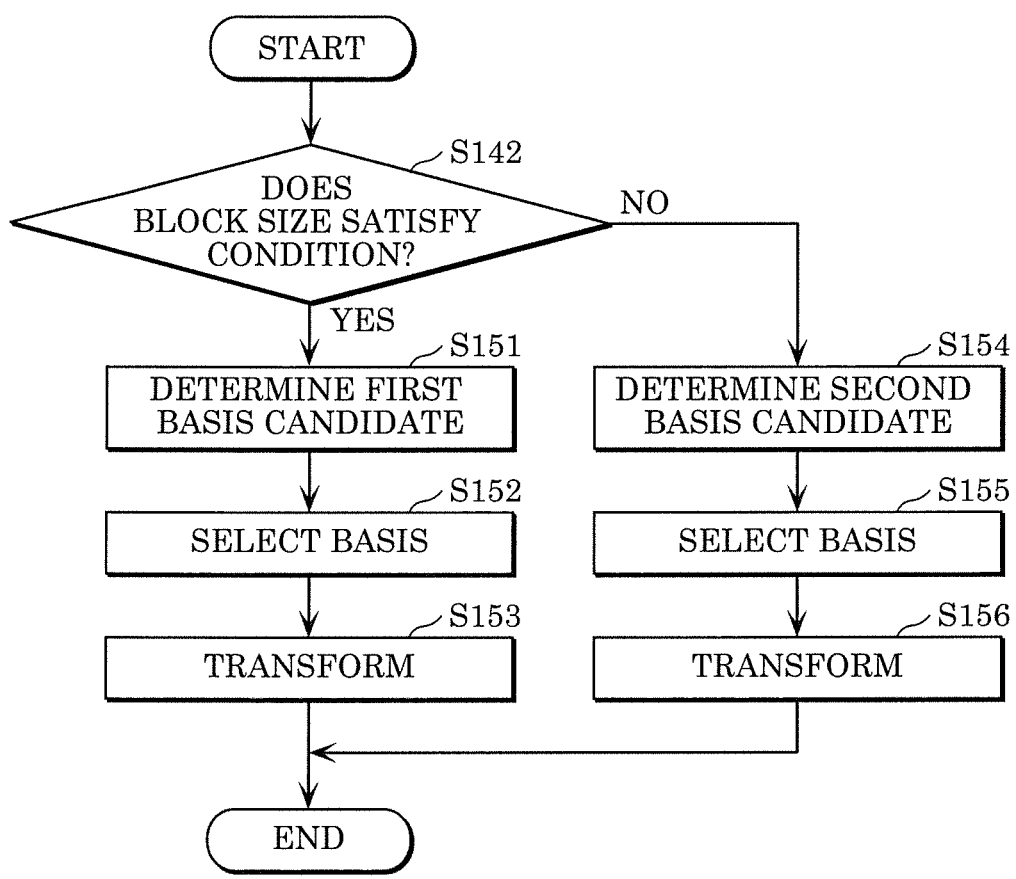
FIG. 32 is a flowchart indicating operations performed by a transformer of an encoder according to Variation 5 of Embodiment 1.

First, operations performed by transformer 106 of encoder 100 according to this variation are specifically described with reference to FIG. 32. FIG. 32 is a flowchart indicating the operations performed by transformer 106 of encoder 100 according to Variation 5 of Embodiment 1.

In this variation, as illustrated in FIG. 32, transformer 106 determines whether the block size of a current block to be encoded satisfies a predetermined condition (S142). Here, in the case where the block size satisfies the predetermined condition (Yes in S142), transformer 106 determines a plurality of first transform basis candidates (S151). For example, DCT2, DST5, and DCT8 can be used as the plurality of first transform basis candidates.

Subsequently, transformer 106 selects a transform basis for the current block from the determined first transform basis candidates (S152). Transformer 106 then transforms the current block using the transform basis selected in Step S152 (S153), and ends the processing.

In the opposite case where the block size does not satisfy the predetermined condition (No in S142), transformer 106 determines one or more second transform basis candidates (S154). The one or more second transform basis candidates are different from the plurality of first transform basis candidates. Here, "different" means being not completely matching. In other words, the plurality of first transform basis candidates and the one or more second transform basis candidates may include one or more common transform bases.

For example, transform bases DST1 and DST7 can be used as the one or more second transform basis candidates. Subsequently, transformer 106 selects a transform basis for the current block from the determined one or more second transform basis candidates (S155). Transformer 106 then transforms the current block using the transform basis selected in Step S155 (S156), and ends the processing.

Although the number of conditional branches in FIG. 32 is 2, it is to be noted that the number of the conditional branches is not limited to 2. For example, the number of conditional branches may be 3 or more. In addition, the number of transform basis candidates may be different or the same for each condition.

[Operations Performed by the Inverse Transformer of the Decoder]

Figure 33:
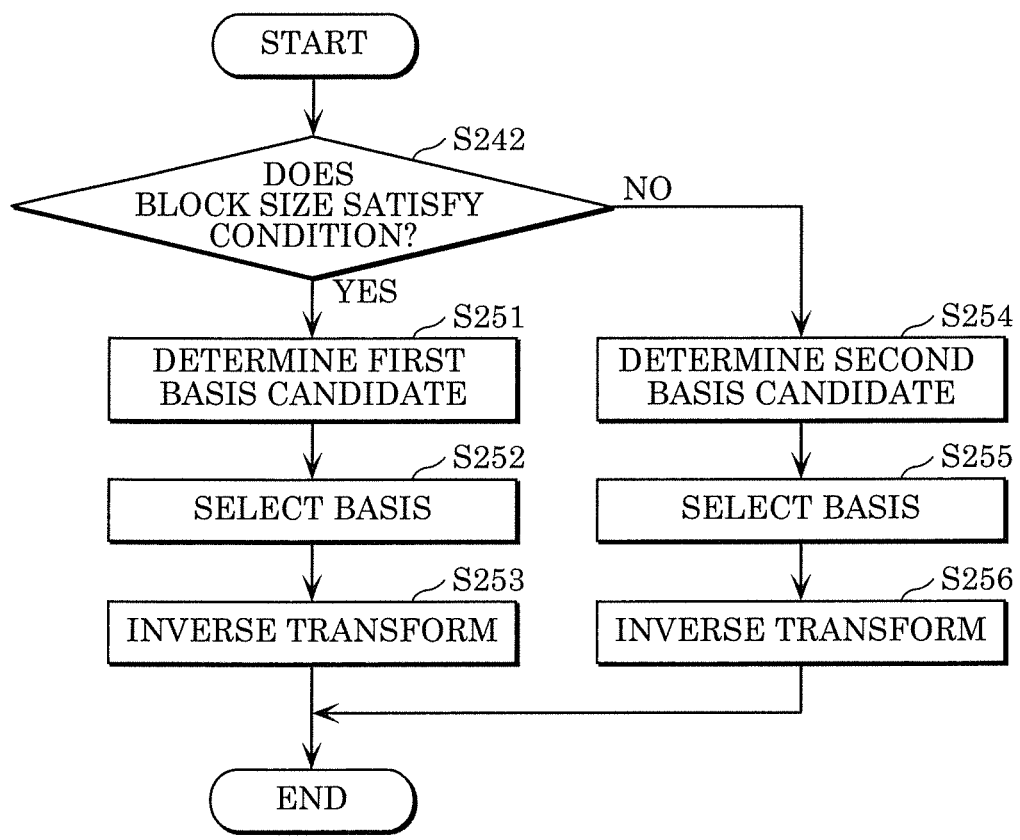
FIG. 33 is a flowchart indicating operations performed by an inverse transformer in a decoder according to Variation 5 of Embodiment 1.

Next, operations performed by inverse transformer 206 of decoder 200 according to this variation are specifically described with reference to FIG. 33. FIG. 33 is a flowchart indicating the operations performed by inverse transformer 206 of decoder 200 according to Variation 5 of Embodiment 1.

In this variation, as illustrated in FIG. 33, inverse transformer 206 determines whether a current block to be decoded has a block size that satisfies a predetermined condition (S242). Here, in the case where the block size satisfies a predetermined condition (Yes in S242), inverse transformer 206 determines a plurality of first inverse transform basis candidates (S251). For example, inverse transform bases DCT2, DST5, and DCT8 are determined as first inverse transform basis candidates. Subsequently, inverse transformer 206 selects an inverse transform basis for the current block from the determined first inverse transform basis candidates (S252). Inverse transformer 206 then inverse-transforms the current block using the inverse transform basis selected in Step S252 (S253), and ends the processing.

In the opposite case where the block size does not satisfy the predetermined condition (No in S242), inverse transformer 206 determines one or more second inverse transform basis candidates (S254). For example, inverse transform bases DST1 and DST7 are determined as second inverse transform basis candidates. Subsequently, inverse transformer 206 selects an inverse transform basis for the current block from the determined second inverse transform basis candidates (S255). Inverse Transformer 206 then inverse transforms the current block using the inverse transform basis selected in Step S255 (S256), and ends the processing.

Effects, Etc., of Variation 4 of Embodiment 1

In Variation 4 of Embodiment 1, the one or more second transform basis candidates are obtained by excluding some transform bases from the plurality of first transform basis candidates. As a result, the second transform basis candidates depend on the first transform basis candidates and are included in first transform bases. In this variation, however, it is possible to remove the condition that the first transform basis candidates and the second transform basis candidates are in an inclusive relationship. Accordingly, it is possible to flexibly determine the first and second transform basis candidates, thereby increasing coding efficiency. For example, it is possible to independently determine transform basis candidates (first transform basis candidates) in the case where the size of a current block to be processed is not a predetermined size and transform basis candidates (second transform basis candidates) in the case where the size of a current block to be processed is the predetermined size. It is to be noted that the first transform basis candidates and the second transform basis candidates may include the same one or more transform bases.

Effects, Etc., of Variation 5 of Embodiment 1

As described above, with encoder 100 and decoder 200 according to Variation 5 of Embodiment 1, it is possible to remove the mutual dependency between the first transform basis candidates and the second transform basis candidates in Variation 4. For example, the second transform basis candidates can include one or more transform bases which are not included in the first transform basis candidates. Accordingly, in this variation, it is possible to increase flexibility in determination of transform basis candidates, thereby enabling use of transform basis candidates more suitable for block sizes than those in Variation 4.

Other Variations of Embodiment 1

Although encoders and decoders according to one or more aspects of the present disclosure have been explained based on the above embodiment and the variations thereof, the present disclosure is not limited to the embodiment and the variations thereof. The one or more aspects of the present disclosure may encompass embodiments obtainable by adding, to any of the embodiment and the variations thereof, various kinds of modifications that a person skilled in the art would arrive at without deviating from the scope of the present disclosure and embodiments configurable by arbitrarily combining constituent elements in different embodiments.

For example, although switching between the fixed basis or bases and the selected basis is made according to the size of the current block in each of Embodiment 1 and Variations 1 to 3 thereof, this is a non-limiting example. For example, switching between the fixed basis or bases and the selected basis may be made based also on the luminance and chrominance of luminance and chrominance blocks in addition to the sizes thereof. More specifically, for example as in the conventional art, a basis DST-VII may be fixedly used for a 4×4 luminance block in intra prediction. In other words, in the case of a luminance block or a chrominance block in inter prediction, a basis selected from among a plurality of bases may be used irrespective of the size thereof.

Although Embodiment 1 and the variations thereof have been described taking orthogonal transform bases as examples, it is to be noted that frequency transforms are not limited to the orthogonal transforms.

It is to be noted that, as illustrated in FIG. 30, Variation 4 of Embodiment 1 indicates non-limiting examples of cases in which DCT2, DCT5, DCT8, DST1, and DST7 are used as the plurality of first transform basis candidates, and either DCT2, DCT8, DST1, and DST7, or DCT2 and DCT5 are used as the one or more second transform basis candidates. For example, bases of types 1 to 8 defined based on boundary conditions and symmetry may be used in each of DCTs and DSTs as the plurality of first transform basis candidates.

It is to be noted that the transform bases included in the first transform basis candidates and the second transform basis candidates do not always need to conform the DCT and DST shapes, and may be bases having any other shapes with properties similar to the properties of the DCT and DST shapes. In addition, the transform bases may be an eigen vector (Karhunen-Loeve transform (KLT)) which can be obtained by main component analysis, or bases (for incomplete transform (IT)) which skip a transform process only in a particular direction in a two-dimensional transform.

It is to be noted that the transform bases may be separable or non-separable. In addition, the transform process in which the transform bases are used may be one-dimensional transform or two-dimensional transform. In addition, when separable transform is applied, a basis may be selected independently in each of the horizontal direction and the vertical direction. In this case, there may be some restrictions on combinations of a basis in the horizontal direction and a basis in the vertical direction. For example, DCT2 may be used only when it is used both in the horizontal direction and in the vertical direction.

It is to be noted that degrees of reduction in processing amount vary even when fast computation methods are present. For this reason, a basis which is determined to require a large processing amount may be excluded from transform basis candidates even when a fast computation method is present. For example, DST7 and DCT8 allow use of a fast computation method for a small block size, the processing amount is larger than the processing amount in the case where DCT2 is used. For this reason, the bases of DST7 and DCT8 are not always included in first transform basis candidates.

Hereinafter, specific examples of combinations of a predetermined condition and transform basis candidates are listed.

(1)
Predetermined condition: the block size is larger than 8
First transform basis candidates: DCT2, DCT5, DCT8, DST1, and DST7
Second transform basis candidate: DCT2
In this combination, when the size of a current block to be encoded/decoded is a size of 8 or less (for example, 4 or 8), a transform process or an inverse transform process is performed on the current block using a transform basis or an inverse transform basis included in transform bases or inverse transform bases of DCT2, DCT5, DCT8, DST1, and DST7. In addition, when the size of a current block to be encoded/decoded is a size larger than 8 (for example, 16 or 32), a transform process or an inverse transform process is performed on the current block using a transform basis or an inverse transform basis included in transform bases or inverse transform bases of DCT2.

(2)
Predetermined condition: the block size is larger than 8
First transform basis candidates: DCT2, DCT5, DCT4, DST1, and DST4
Second transform basis candidates: DCT2, DCT4, and DST4
In this combination, when the size of a current block to be encoded/decoded is a size of 8 or less (for example, 4 or 8), a transform process or an inverse transform process is performed on the current block using a transform basis or an inverse transform basis included in transform bases or inverse transform bases of DCT2, DCT5, DCT4, DST1, and DST4. In addition, when the size of a current block to be encoded/decoded is a size larger than 8 (for example, 16 or 32), a transform process or an inverse transform process is performed on the current block using a transform basis or an inverse transform basis included in transform bases or inverse transform bases of DCT2, DCT3, and DST4.

(3)
Predetermined condition: the block size is larger than 16
Second transform basis candidates: DCT2, DCT4, DST4, and IT
Second transform basis candidates: DCT2 and IT
In this combination, when the size of a current block to be encoded/decoded is a size of 16 or less (for example, 4, 8, or 16), a transform process or inverse transform process is performed on the current block using a transform basis or an inverse transform basis included in transform bases or inverse transform bases of DCT2, DCT4, DST4, and IT. In addition, when the size of a current block to be encoded/decoded is a size larger than 16 (for example, 32), a transform process or an inverse transform process is performed on the current block using a transform basis or an inverse transform basis included in transform bases or inverse transform bases of DCT2 and IT.

(4)
Predetermined condition: the block size is larger than 16
First transform basis candidates: DCT2, DCT4, DST4, and IT
Second transform basis candidate: DCT2
In this combination, when the size of a current block to be encoded/decoded is a size of 16 or less (for example, 4, 8, or 16), a transform process or an inverse transform process is performed on the current block using a transform basis or an inverse transform basis included in transform bases or inverse transform bases of DCT2, DCT4, DST4, and IT. In addition, when the size of a current block to be encoded/decoded is a size larger than 16 (for example, 32), a transform process or an inverse transform process is performed on the current block using a transform basis or an inverse transform basis of DCT2.

(5)
Predetermined condition: the block size is larger than 16
First transform basis candidates: DCT2, DCT4, and DST4
Second transform basis candidate: DCT2
In this combination, when the size of a current block to be encoded/decoded is a size of 16 or less (for example, 4, 8, or 16), a transform process or an inverse transform process is performed on the current block using a transform basis or an inverse transform basis included in transform bases or inverse transform bases of DCT2, DCT4, and DST4. In addition, when the size of a current block to be encoded/decoded is a size larger than 16 (for example, 32), a transform process or an inverse transform process is performed on the current block using a transform basis or an inverse transform basis of DCT2.

It is to be noted that the plurality of combinations (1) to (5) are indicated as non-limiting examples. For example, in each of the above combinations, DCT8 and DST7 may be used instead of DCT4 and DST4. In addition, for example, 32 or 64 may be used instead of 8 and 16 as block sizes in predetermined conditions.

Embodiment 2

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoder that employs the image encoding method, an image decoder that employs the image decoding method, and an image encoder/decoder that includes both the image encoder and the image decoder. Other configurations included in the system may be modified on a case-by-case basis.

[Usage Examples]

Figure 34:
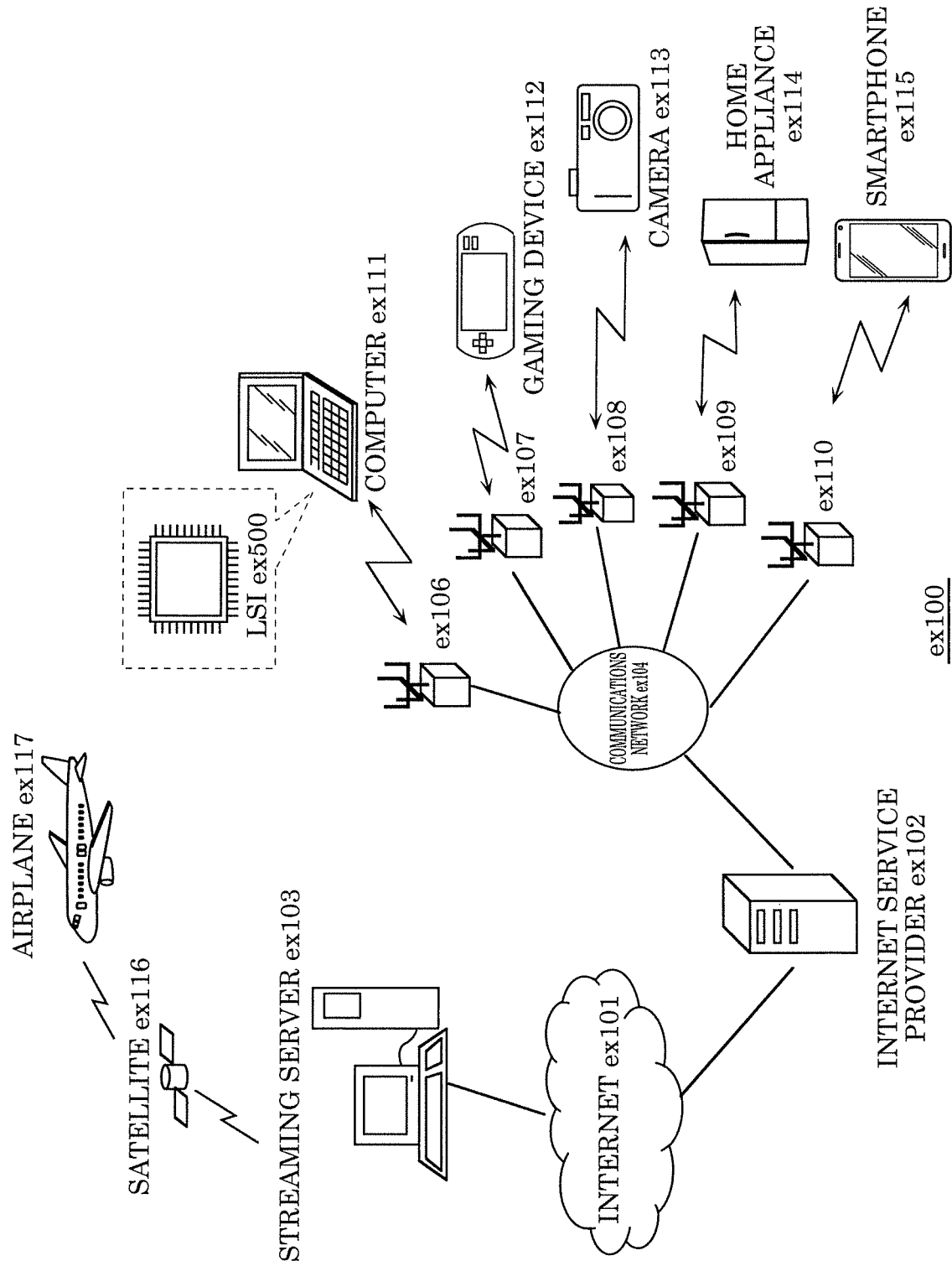
FIG. 34 illustrates an overall configuration of a content providing system for implementing a content distribution service.

FIG. 34 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an α value indicating transparency, and the server sets the α value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 35:
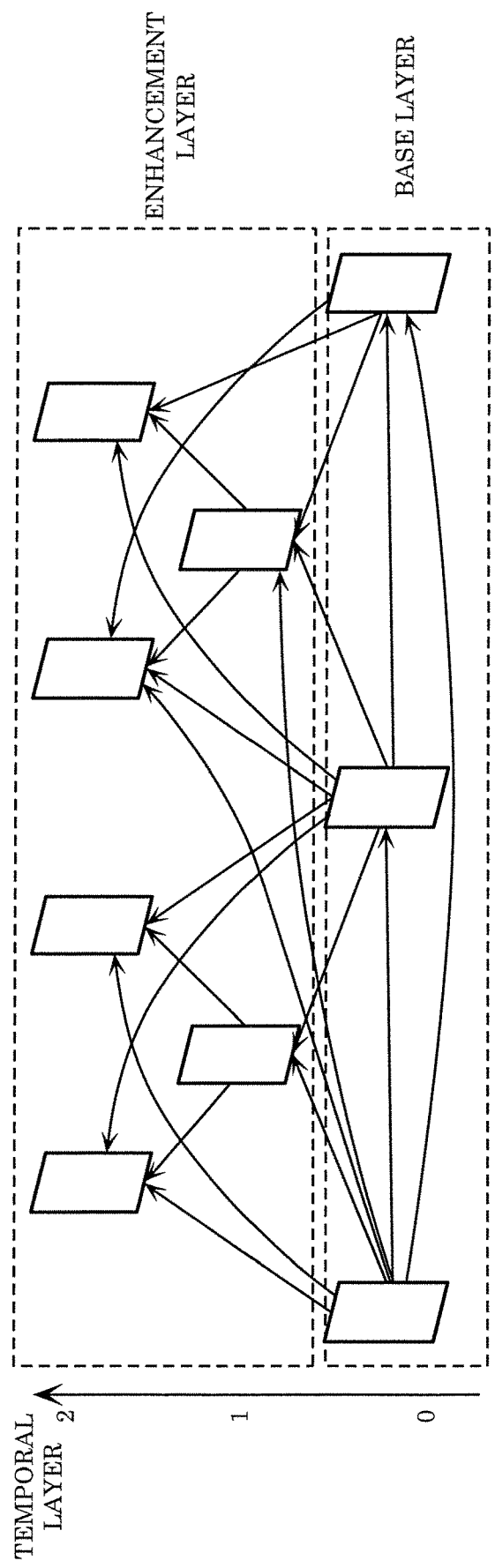
FIG. 35 illustrates one example of an encoding structure in scalable encoding.

The switching of content will be described with reference to a scalable stream, illustrated in FIG. 35, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 35. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 36:
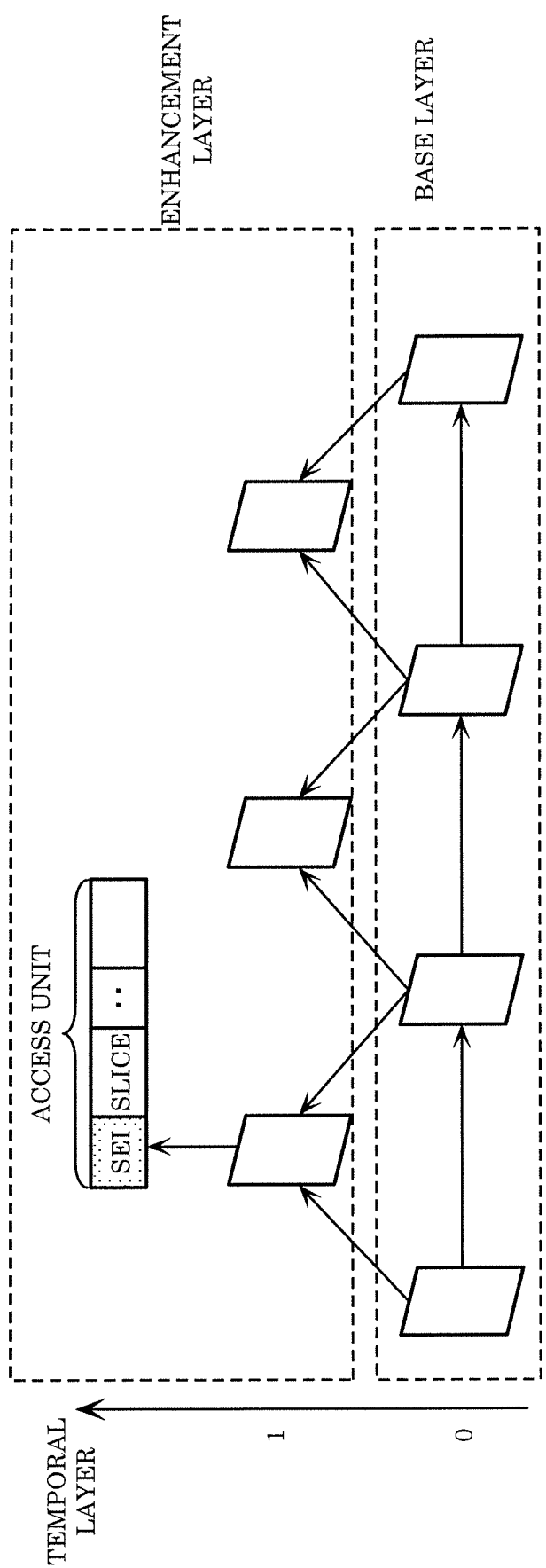
FIG. 36 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 36, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

[Web Page Optimization]

Figure 37:
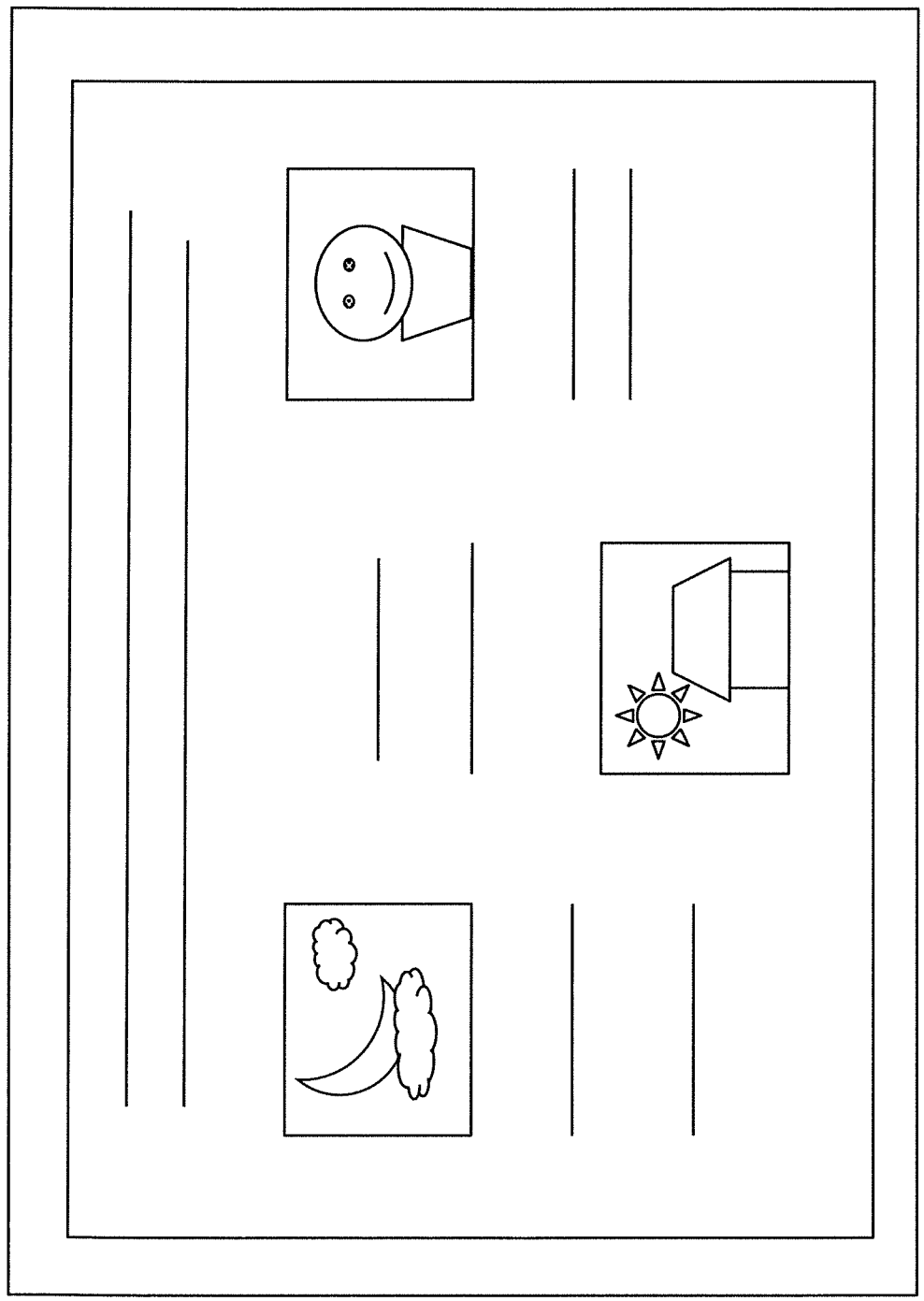
FIG. 37 illustrates an example of a display screen of a web page.
Figure 38:
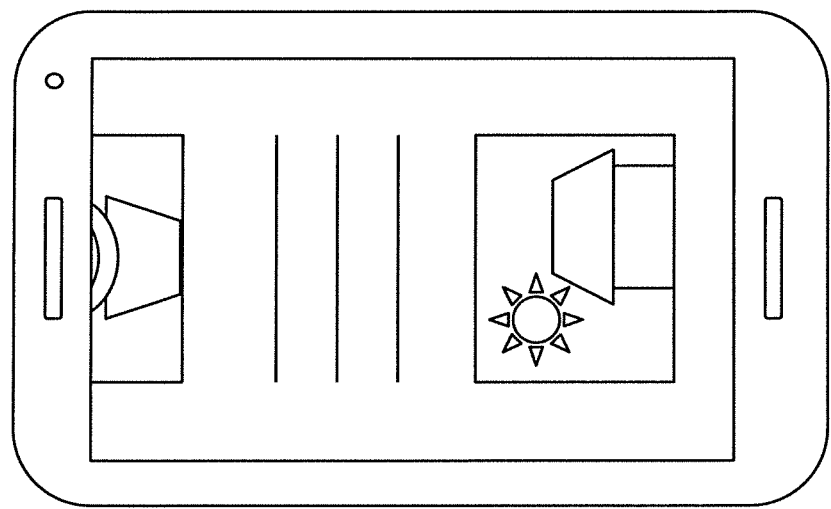
FIG. 38 illustrates an example of a display screen of a web page.

FIG. 37 illustrates an example of a display screen of a web page on, for example, computer ex111. FIG. 38 illustrates an example of a display screen of a web page on, for example, smartphone ex115. As illustrated in FIG. 37 and FIG. 38, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture, and the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

[Other Usage Examples]

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 39:
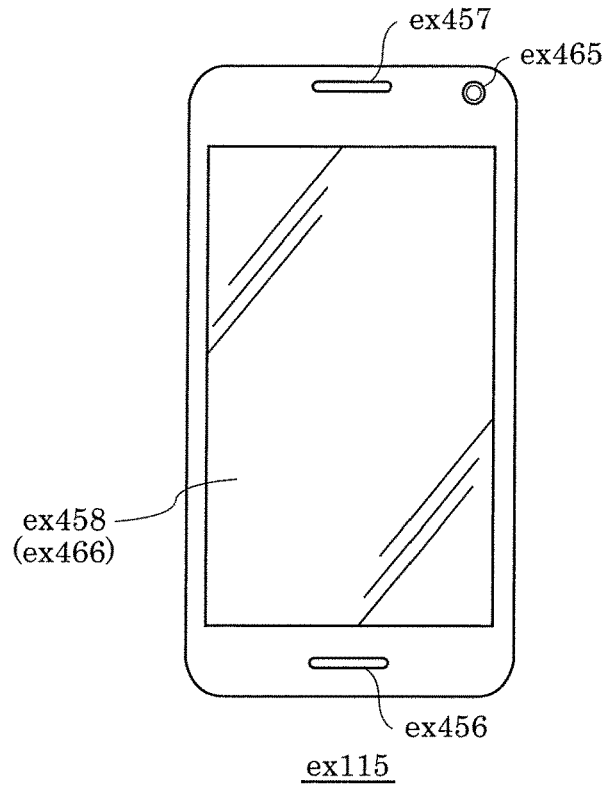
FIG. 39 illustrates one example of a smartphone.
Figure 40:
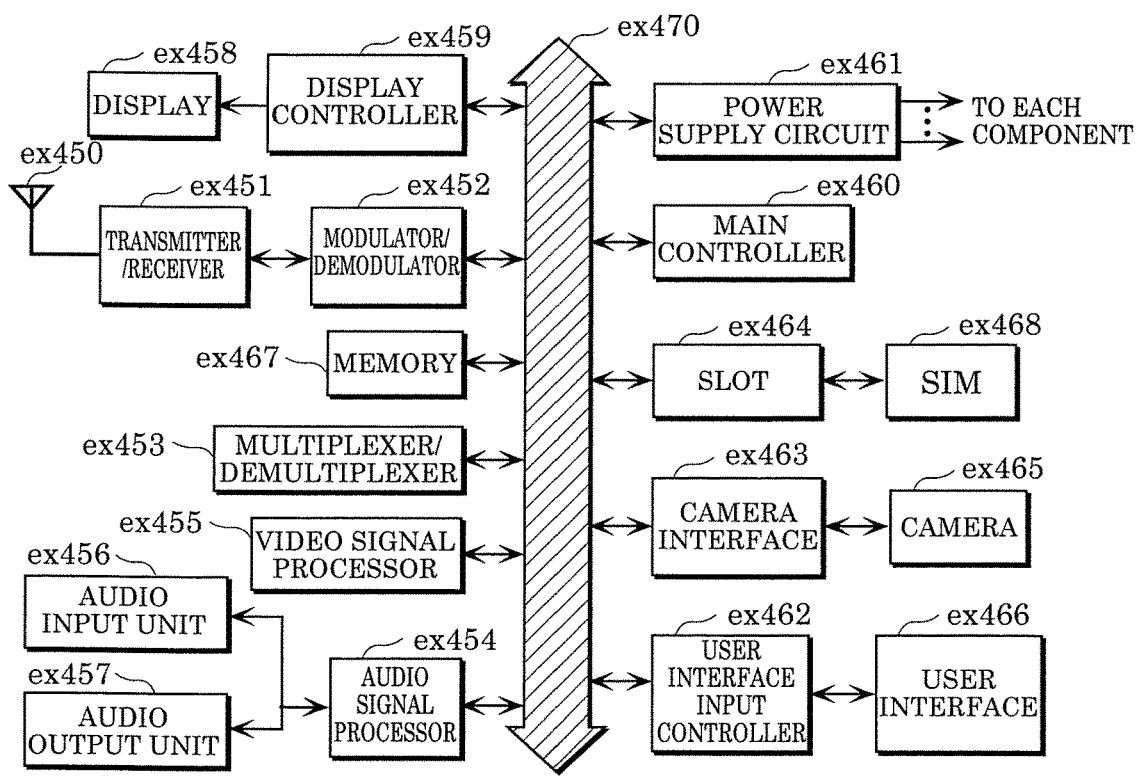
FIG. 40 is a block diagram illustrating a configuration example of a smartphone.

FIG. 39 illustrates smartphone ex115. FIG. 40 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to, for example, television receivers, digital video recorders, car navigation systems, mobile phones, digital cameras, digital video cameras, etc.

What is claimed is:

1. A decoder which inverse-transforms a current block to be decoded in an encoded image to decode the current block, the decoder comprising:

circuitry; and memory, wherein the circuitry, using the memory:

determines a first group of candidates and inverse-transforms the current block using an inverse transform basis which is one of the candidates included in the first group of candidates determined, when the current block has a size of 16 or less; and determines one second candidate outside of the first group of candidates and inverse-transforms the current block using an inverse transform basis which is the second candidate determined, when the current block has a size larger than 16.

2. A decoding method for inverse-transforming a current block to be decoded in an encoded image to decode the current block, the decoding method comprising:

determining a first group of candidates and inverse-transforming the current block using an inverse transform basis which is one of the candidates included in the first group of candidates determined, when the current block has a size of 16 or less; and determining one second candidate outside of the first group of candidates and inverse-transforming the current block using an inverse transform basis which is the second candidate determined, when the current block has a size larger than 16.

* * * * *